US011525662B2

(12) United States Patent
Toride et al.

(10) Patent No.: US 11,525,662 B2
(45) Date of Patent: Dec. 13, 2022

(54) ELECTROMECHANICAL DISPLACEMENT SENSOR

(71) Applicant: Meta Platforms Technologies, LLC, Menlo Park, CA (US)

(72) Inventors: Yuri Toride, Redmond, WA (US); Tamer Elazhary, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 146 days.

(21) Appl. No.: 17/010,593

(22) Filed: Sep. 2, 2020

(65) Prior Publication Data

US 2022/0049944 A1 Feb. 17, 2022

Related U.S. Application Data

(60) Provisional application No. 63/065,186, filed on Aug. 13, 2020.

(51) Int. Cl.
    *G01B 7/14* (2006.01)
    *G01B 7/30* (2006.01)
    (Continued)

(52) U.S. Cl.
    CPC ............... *G01B 7/14* (2013.01); *G01B 7/30* (2013.01); *G01D 5/2412* (2013.01); *G09G 3/007* (2013.01); *G02B 6/0016* (2013.01)

(58) Field of Classification Search
    CPC ... G01B 7/14; G01B 7/30; G01D 5/24; G02B 6/0016; G09G 3/007; G01L 1/146;
    (Continued)

(56) References Cited

U.S. PATENT DOCUMENTS

| 5,130,660 A | 7/1992 | Flint et al. |
| 10,241,129 B1 * | 3/2019 | Ba-Tis .................. G01P 15/125 |

(Continued)

FOREIGN PATENT DOCUMENTS

| EP | 3076136 A1 | 10/2016 |
| WO | WO 2016/020716 A1 | 2/2016 |

OTHER PUBLICATIONS

Ba-Tis, F. et al. "A 3-DOF MEMS Electrostatic Piston-Tube Actuator." Journal of Microelectromechanical Systems, vol. 24, No. 4, Aug. 2015, pp. 1173-1184.

(Continued)

*Primary Examiner* — Richard J Hong
(74) *Attorney, Agent, or Firm* — Fenwick & West LLP

(57) ABSTRACT

A displacement sensor measures capacitance between a rotor-stator pair. The displacement sensor includes a plurality of stators coupled to a first object. The plurality of stators is oriented parallel to an axis of motion between the first object and a second object. The displacement sensor further includes a plurality of rotors coupled to the second object. The plurality of rotors is oriented parallel to the axis of motion. Each rotor of the plurality of rotors is aligned with and configured to receive a corresponding stator of the plurality of stators to create a respective rotor-stator pair. Capacitance between the rotor-stator pairs change as a function of position of the first object relative to the second object along the axis of motion. An amount of displacement of the first object relative to the second object is determined based in part on the capacitance values.

20 Claims, 13 Drawing Sheets

(51) Int. Cl.
  *G09G 3/00* (2006.01)
  *G01D 5/241* (2006.01)
  *F21V 8/00* (2006.01)

(58) Field of Classification Search
  CPC ... G01L 5/0038; G06T 3/4053; B06B 1/0292; H04N 5/2253; B81B 3/0062; B81B 3/0021; G01P 15/125; G01P 1/003; G01C 21/16
  See application file for complete search history.

(56) References Cited

U.S. PATENT DOCUMENTS

| | | | |
|---|---|---|---|
| 10,582,100 B1* | 3/2020 | Ba-Tis | H04N 5/2253 |
| 10,608,557 B1* | 3/2020 | Ba-Tis | B81B 3/0062 |
| 2007/0245826 A1* | 10/2007 | Cardarelli | G01C 21/16 73/504.12 |
| 2008/0178674 A1 | 7/2008 | Walmsley | |
| 2009/0152980 A1* | 6/2009 | Huang | B06B 1/0292 310/309 |
| 2011/0175629 A1 | 7/2011 | Duden | |
| 2016/0216165 A1* | 7/2016 | Ba-Tis | G01L 1/146 |
| 2016/0328068 A1* | 11/2016 | Ba-Tis | G01L 5/0038 |
| 2017/0366103 A1* | 12/2017 | Ba-Tis | B81B 3/0021 |
| 2019/0113829 A1* | 4/2019 | Waldern | G06T 3/4053 |
| 2020/0126252 A1 | 4/2020 | Iyer et al. | |
| 2020/0185590 A1 | 6/2020 | Malhotra et al. | |
| 2020/0408803 A1* | 12/2020 | Konno | G01P 1/003 |

OTHER PUBLICATIONS

Chen, Z. et al. "Design and Implementation of Capacitive Proximity Sensor Using Microelectromechanical Systems Technology." IEEE Transactions on Industrial Electronics, vol. 45, No. 6, Dec. 1998, pp. 886-894.

Huang, Y. et al. "A Flexible Three-Axial Capacitive Tactile Sensor with Multilayered dielectric for Artificial Skin Applications." Microsystem Technologies, vol. 23, 2017, pp. 1847-1852.

Sun, Y. et al. "A Novel Three-Axial Force Tactile Sensor Based on the Fringing Effect of Electric Field." IEEE Transactions on Magnetics, vol. 55, No. 9, Sep. 2019, pp. 1-5.

Tsuchiya, T. et al. "A z-Axis Differential Capacitive SOI Accelerometer with Vertical Comb Electrodes." Sensors and Actuators A, vol. 116, No. 3, Oct. 29, 2004, pp. 378-383.

Wang, J. et al. "Silicon-on-Insulator Out-of-Plane Electrostatic Actuator with In Situ Capacitive Position Sensing." Journal of Micro/Nanolithography, MEMS, and MOEMS, vol. 11, No. 3, Jul.-Sep. 2012, pp. 1-8.

Xie, H. et al. "Vertical Comb-Finger Capacitive Actuation and Sensing for CMOS-MEMS." Sensors and Actuators A, vol. 95, Nos. 2-3, Jan. 1, 2002, pp. 212-221.

International Search report and Written Opinion for International Application No. PCT/US2021/043350, dated Oct. 14, 2021, 11 pages.

* cited by examiner

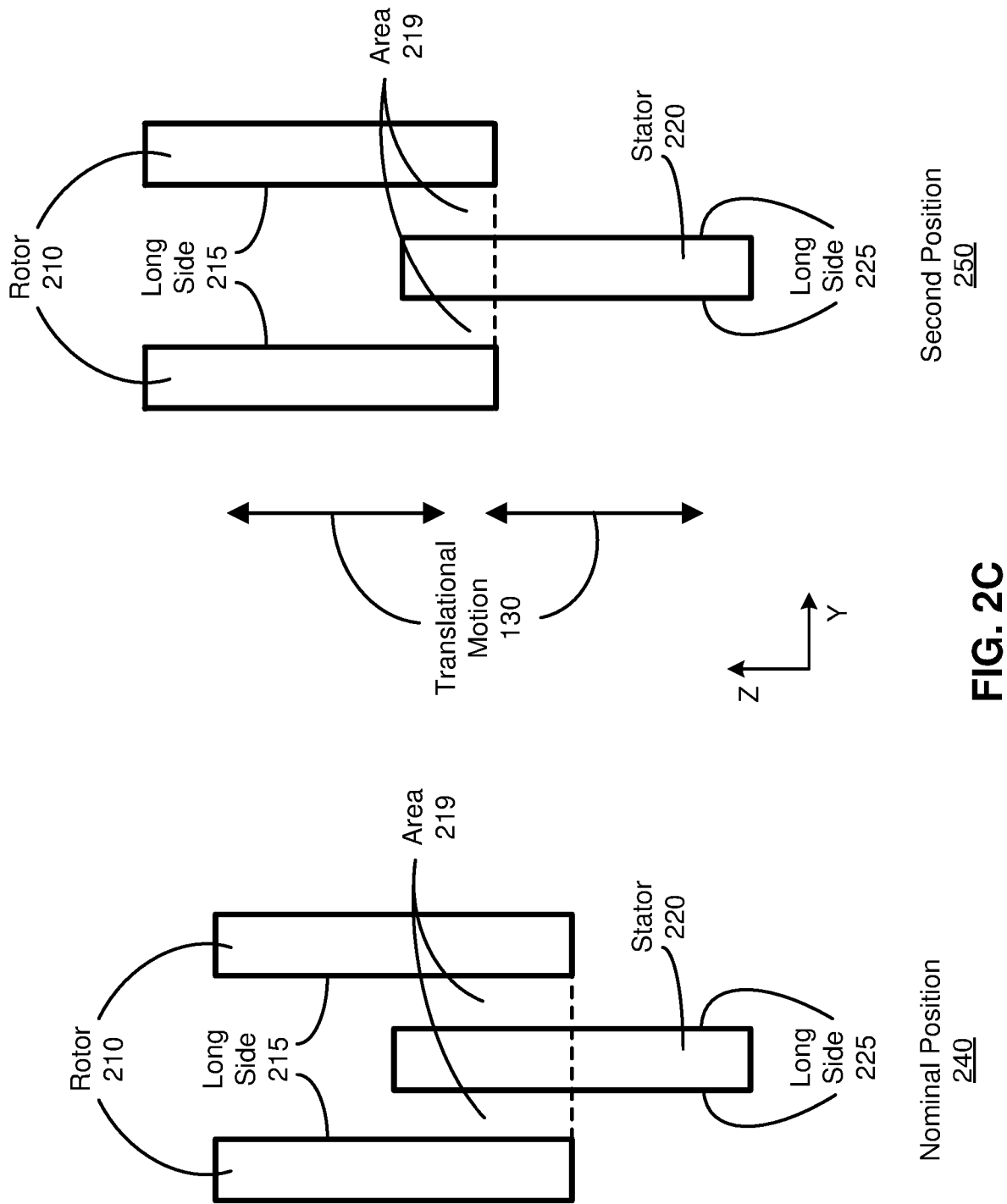

ELECTROMECHANICAL DISPLACEMENT SENSOR

CROSS-REFERENCE TO RELATED APPLICATIONS

This application claims the benefit of U.S. Provisional Application No. 63/065,186, filed Aug. 13, 2020, which is incorporated by reference in its entirety.

FIELD OF THE INVENTION

This disclosure relates generally to displacement sensors, and more specifically to electromechanical displacement sensors configured to sense displacement in up to five degrees of freedom.

BACKGROUND

Many displacement sensor devices measure the capacitance or change in capacitance between two conductive objects and derive displacement measurements for the two objects based on the measured capacitance values. Displacement measurements may include translational measurements and/or rotational measurements. When considering a standard three-dimensional coordinate system (e.g., with an x axis, a y axis, and a z axis), translational measurements are related to movement along (i.e., parallel to) the axes and rotational measurements are related to rotational movement around the axes; thus, there is a possible six degrees of freedom displacements for measuring. Typically, displacement sensor devices may measure one translational measurement only or one rotational measurement only. Accordingly, typically multiple displacement sensors are used to monitor movement along different translations and/or rotational directions.

SUMMARY

Electromechanical displacement sensors (or "displacement sensors") measure capacitance between two objects (e.g., a first object and a second object) in order to determine an amount of displacement between the first object relative to the second object. A displacement sensor may include a plurality of stators made from conductive material coupled to the first object and oriented parallel to an axis of motion (e.g., the z axis). The plurality of stators is coupled to the first object such that movement of the first object cause the stators to move in a same direction as the first object. The displacement sensor may also include a plurality of rotors made from conductive material coupled to the second object and oriented parallel to an axis of motion (i.e., the z axis). The plurality of rotors is coupled to the second object such that movement of the second object cause the rotors to move in a same direction as the second object. During operation, for example, the second object and plurality of rotors move along the axis of motion (e.g., move in a positive or negative z direction) and/or rotate relative to an axis of motion (e.g., rotate around the x axis in a positive or negative direction and/or rotate around the y axis in a positive or negative direction). As the second object moves and/or rotates relative to the first object, capacitance between the rotors and the stators changes (i.e., increases or decreases). The capacitance is measured and analyzed to determine an amount of displacement between the second object relative to the first object. For example, change(s) in the capacitance measurements correspond to amount(s) of displacement. The displacement may be a translational displacement in the z direction, a rotational (tip) displacement, a rotational (tilt) displacement, or some combination thereof.

In some embodiments, the displacement sensor includes a plurality of stators and a plurality of rotors. The plurality of stators is coupled to a first object and oriented parallel to an axis of motion between the first object and a second object. The plurality of rotors is coupled to the second object and oriented parallel to the axis of motion. Each rotor is aligned with and configured to receive a corresponding stator to create a respective rotor-stator pair. Capacitance values of the rotor-stator pairs change as a function of position of the first object relative to the second object along the axis of motion. An amount of displacement of the first object relative to the second object is determined based in part on the capacitance values.

In some embodiments, the displacement sensor is included in a device (e.g., a headset device). The displacement sensor measures capacitance of rotor-stator pairs. The displacement sensor includes a plurality of stators coupled to a first object. The plurality of stators is oriented parallel to an axis of motion between the first object and a second object. The displacement sensor further includes a plurality of rotors coupled to the second object. The plurality of rotors is oriented parallel to the axis of motion. Each rotor of the plurality of rotors is aligned with and configured to receive a corresponding stator of the plurality of stators to create a respective rotor-stator pair. The device further includes a displacement controller. The displacement controller determines an amount of displacement of the first object relative to the second object based on the measured capacitance of the rotor-stator pairs. The measured capacitance of the rotor-stator pairs changes as a function of position of the first object relative to the second object along the axis of motion.

BRIEF DESCRIPTION OF THE DRAWINGS

FIG. 2C is a cross section of two positions of the rotor-stator pair of FIG. 2A.

Figure 1A:
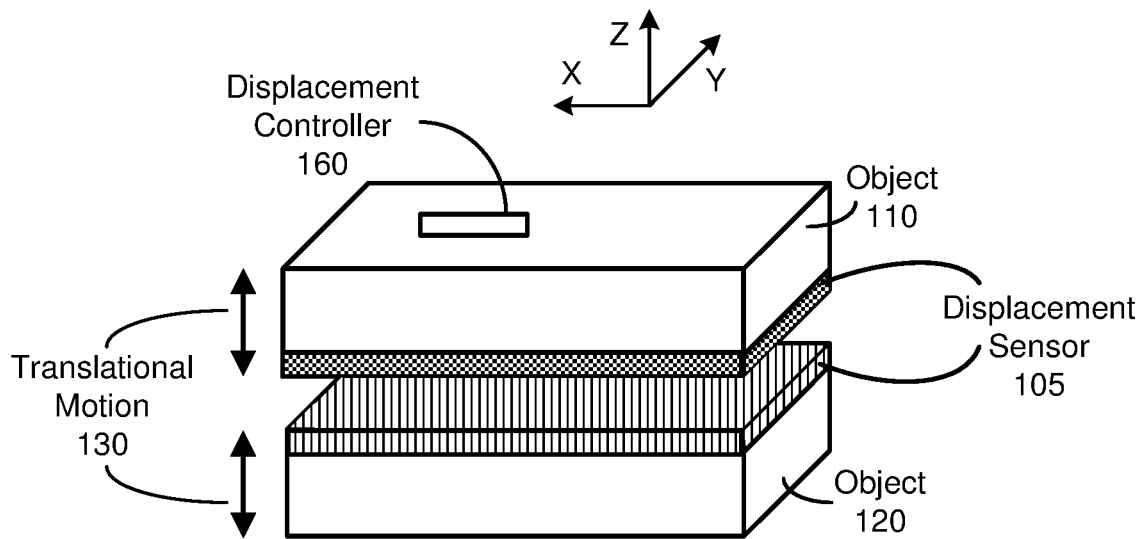
FIG. 1A illustrates a translational motion between two objects, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An electromechanical displacement sensor ("displacement sensor") measures capacitance between two objects (i.e., a first object and a second object) over time. In one implementation, the displacement sensor may include a rotor assembly with a plurality of rotors coupled to the first object and a stator assembly with a plurality of stators coupled to the second object. In some embodiments, the plurality of rotors may be directly attached to the first object and/or the plurality of stators may be directly attached to the second object. The plurality of rotors is coupled to the first object such that the plurality of rotors moves in the same direction (e.g., translational and/or rotational) as the first object. The plurality of stators is coupled to the second object such that the plurality of stators moves in the same direction (e.g., translational and/or rotational) as the second object. The plurality of rotors of the rotor assembly and the plurality of stators of the stator assembly may be made from one or more conductive materials. During operation of the displacement sensor, the plurality of rotors and the plurality of stators are supplied with a voltage.

In one embodiment, each rotor and each stator may be rectangular in shape (e.g., the rotors may be hollow rectangular boxes with open bottom sides and the stators may be rectangular columns. In one embodiment, all of the rotors and all of the stators are arranged with the long sides of each rotor and the long sides of each stator arranged parallel to a first plane (e.g., the x-z plane). In this embodiment, translational motion of the objects (i.e., movement of the first object and/or the second object in the z direction) and/or rotational motion of the objects (i.e., movement of the first object and/or the second object around the y axis) may be determined.

In another embodiment, a first subset of the rotors and a first subset of the stators are arranged with their long sides aligned parallel to the first plane (i.e., the x-z plane) and a second subset of the rotors and a second subset of the stators are arranged with their long sides aligned parallel to a second plane (i.e., the y-z plane). In this embodiment, translational motion of the objects (i.e., movement of the first object and/or the second object in the z direction, in the y direction, and/or in the x direction) and/or rotational motion of the objects (i.e., movement of the first object and/or the second object around the y axis) and/or rotational motion of the objects (i.e., movement of the first object and/or the second object around the x axis) may be determined. Thus, the displacement sensor with this configuration of rotors and stators can sense displacement in up to five degrees of freedom.

Regardless of the alignment of the rotors and the stators, each rotor of the plurality of rotors is configured to receive a corresponding stator of the plurality of stators to create a respective rotor-stator pair (e.g., the hollow rectangular rotor receives the rectangular column stator within a cavity). Capacitance values measured by the displacement sensor are measured in areas within the rotor-stator pair (i.e., in between the long sides of the rotor and the stator within the cavity) as voltage is applied to the plurality of rotors and the plurality of stators.

In another implementation, the displacement sensor may include a plurality of electrodes coupled to the first object. In one embodiment, the plurality of electrodes may be directly attached to the first object. The plurality of electrodes is coupled to the first object such that the plurality of electrodes moves in the same direction (e.g., translational) as the first object. During operation of the displacement sensor, the electrodes are supplied with a voltage and generate fringe fields in the space (or area) in between the first object (and the electrodes) and the second object. The displacement sensor measures the capacitance values within the fringe fields.

The displacement sensor provides the capacitance measurements to a displacement controller for determining an amount of displacement of the objects relative to each other. The displacement sensor and the displacement controller may be part of a displacement system. With the capacitance values being directly affected by conductive surface area and indirectly affected by distance, the displacement controller may compare measured capacitance values over time to determine the amount of displacement (e.g., an amount the first object moved relative to the second object). The displacement controller may determine an amount of translational motion and/or one or two rotational motions the first object underwent relative to the second object, the second object underwent relative to the first object, or the two objects underwent relative to each other. The displacement controller may determine an amount of displacement correction needed to move one or more objects back to a nominal position.

Conventional displacement sensor devices determine only a translational motion of one object relative to another or a rotational motion. Thus, conventional displacement sensor devices may determine one degree of freedom of motion. However, objects may undergo more motion than just one degree. For example, an object may undergo a translational motion along a first axis, a rotational motion around a second axis, and a rotational motion around a third axis. In contrast, the displacement sensor described herein can determine translation as well as tip and tilt. Additionally, the two objects experiencing the translational and/or rotational motions may be of a small form factor and may undergo fine translational and/or rotational motions. Accordingly, the displacement sensor device may be a small form factor (e.g., a few square millimeters) and be able to detect the finer movements that may take place between two objects due to the structure of the displacement sensor providing an increased surface area for taking measurements and increased movable range. The displacement sensor device provides differential sensing with improved sensitivity.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A illustrates a translational motion 130 between two objects (i.e., an object 110 and an object 120), in accordance with one or more embodiments. The translation motion 130 between the object 110 and the object 120 is an up and down motion of the objects 110, 120 relative to each other. For example, the translational motion 130 may include the object 110 moving up or down and the object 120 remaining stationary, the object 120 moving up or down and the object 110 remaining stationary, or both the object 110 and the object 120 moving up or down. The translation motion 130 is parallel to an axis of motion (e.g., the z axis). A displacement sensor 105 may be coupled to both the object 110 and the object 120. In another embodiment (discussed in further detail in FIG. 6), the displacement sensor may be coupled to one of the object 110 or the object 120. In one embodiment, the displacement sensor 105 is directly attached to the object 110 and the object 120. The displacement sensor 105 performs capacitance measurements over time and provides the measurements to a displacement controller 160. In one embodiment, the displacement sensor 105 and the displacement controller 160 are components of a displacement system. The structure and operation of the displacement sensor 105 is described in further detail in FIGS. 2A-6 and the displacement system is described in further detail in FIG. 9.

The displacement controller 160 determines an amount of displacement between the two objects 110, 120 based on the capacitance measurements provided by the displacement sensor 105. For example, the object 110 and the object 120 may begin in a starting position (i.e., a nominal position) and the displacement sensor 105 measures a particular capacitance value between the two objects 110, 120. In this example, as the object 110 undergoes a translational motion 130 (e.g., moves down closer to the object 120), the capacitance values measured by the displacement sensor 105 increase. Based on the amount of increase of the capacitance values, the amount of displacement (i.e., an amount of position change of the object 110 relative to the object 120) may be determined by the displacement controller 160.

The displacement controller 160 may be attached to or included within the structure of the object 110 or the structure of the object 120. In one example implementation, the object 110 and the object 120 are components of a larger device (e.g., a headset device where the object 110 may be a projector, the object 120 may be a waveguide, and the displacement controller 160 may be attached to a separate component (e.g., a frame) of the headset device). This example implementation is described in further detail in FIG. 7.

Figure 1B:
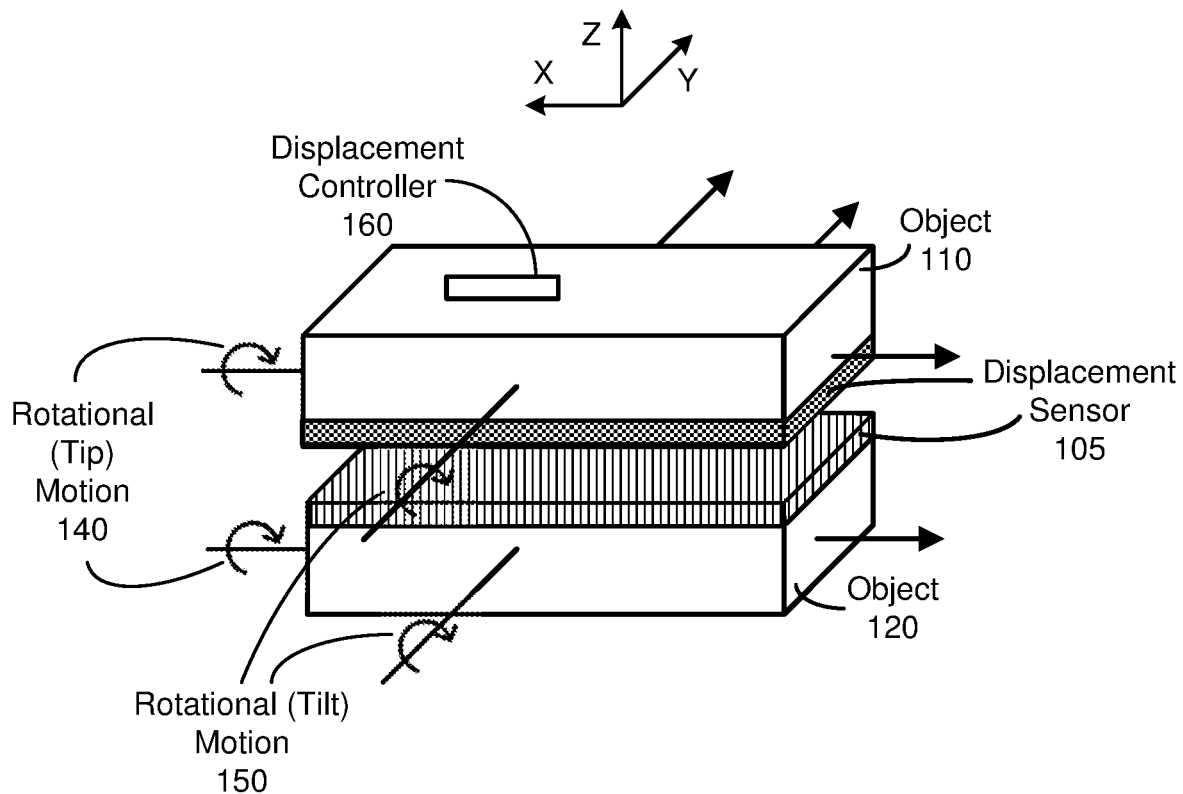
FIG. 1B illustrates two rotational motions between the two objects of FIG. 1A.

FIG. 1B illustrates two rotational motions (i.e., a rotational motion 140 and a rotational motion 150) between the two objects 110, 120 of FIG. 1A. The rotational motion 140 may be associated with a tipping motion of the object 110 and/or the object 120. The rotational motion 150 may be associated with a tilting motion of the object 110 and/or the object 120. In one embodiment, the rotational (tip) motion 140 is a rotation around an axis substantially parallel to the x axis and the rotational (tilt) motion 150 is a rotation around an axis substantially parallel to the y axis which is perpendicular to the rotational axis of the rotational motion 140. The displacement controller 160 may determine an amount of displacement (i.e., may determine one or more rotational measurements) between the two objects 110, 120 based on capacitance measurements provided by the displacement sensor.

The reference axis for determining any amount of translational motion and/or tip motion and/or tilt motion is placed when the two objects 110, 120 are parallel to each other in the x-y plane. For example, a reference axis may be placed when the two objects are in the nominal position.

Figure 2B:
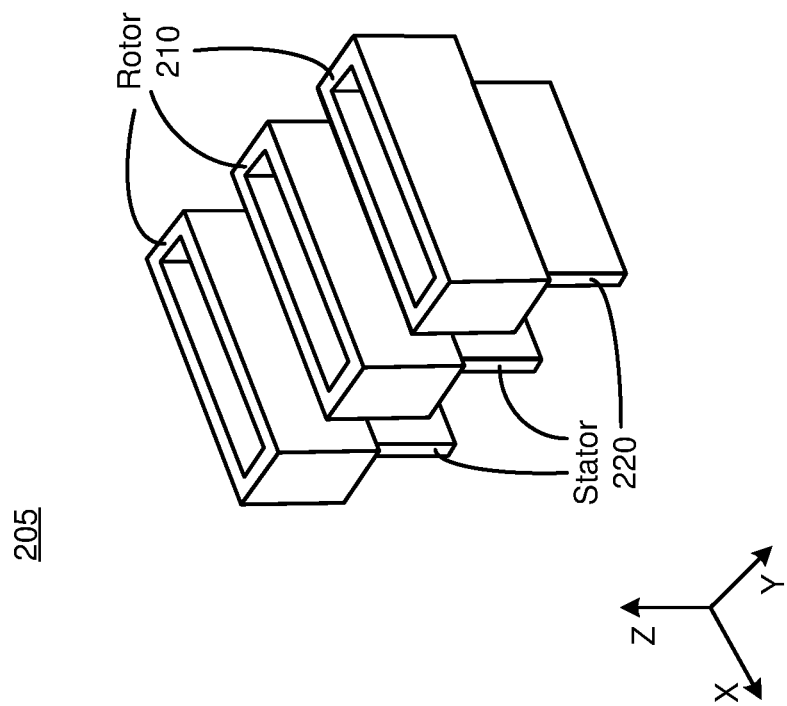
FIG. 2B is a perspective view of a plurality of rotor-stator pairs of the displacement sensor from FIG. 2A.
Figure 2A:
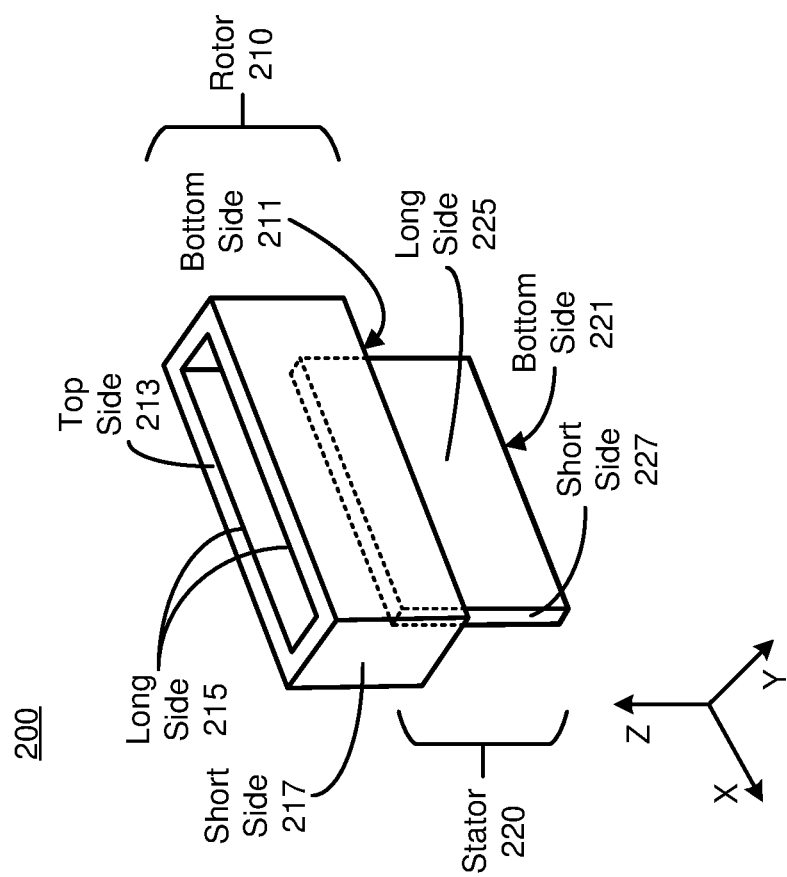
FIG. 2A is a perspective view of a rotor-stator pair of a displacement sensor, in accordance with one or more embodiments.

FIG. 2A is a perspective view of a rotor-stator pair 200 of a displacement sensor, in accordance with one or more embodiments. The rotor-stator pair 200 includes a rotor 210 and a stator 220. In the illustrated embodiment of FIG. 2A, the rotor 210 is a hollow rectangular box with an open bottom side 211 for receiving the stator 220. In one embodiment, a top side 213 of the rotor 210 may be coupled to a first object (e.g., the object 110). In some embodiments (not shown), the top side 213 is closed (i.e., solid with no opening). The stator 220 is a rectangular column. In one embodiment, a bottom side 221 of the stator 220 may be coupled to a second object (e.g., the object 120). The long sides 215 of the rotor 210 are aligned parallel with the long sides 225 of the stator 220 and the short sides 217 of the rotor 210 are aligned parallel with the short sides 227 of the stator 220. In the illustrated embodiment, the long sides 215, 225 of both the rotor 210 and the stator 220 are aligned substantially parallel to the x-z plane and the short sides 217, 227 of the rotor 210 and the stator 220 are aligned substantially parallel to the y-z plane. The rotor 210 and the stator 220 are aligned such that the stator 220 (i.e., a top side of the stator 220, not shown) fits into the cavity (i.e., the hollow of the rectangular rotor 210) during translational motions (i.e., motions along an axis substantially parallel to the z axis) of the rotor 210, the stator 220, or a combination of both. In FIG. 2A, the rotor-stator pair 200 is illustrated in a nominal position (i.e., the stator 220 is partially within the cavity of the rotor 210). In some embodiments, half of the stator 220 is inside the cavity of the rotor 210 in the nominal position. The nominal position is described in further detail in FIG. 2C.

The rotor and the stator may have different shapes (not shown) that are asymmetrical or symmetrical. For example, the rotor may be a hollow square box with an open bottom side for receiving the stator that is in the shape of a square column. In another example, the rotor may be a hollow sphere with an open bottom portion for receiving the stator that is in the shape of a solid sphere. In this example, a diameter of the stator is less than a diameter of the rotor such that the rotor may receive the stator during translational motions. In other examples, the rotor and the stator may have triangular shapes, ovular shapes, and so on.

In some embodiments, the rotor 210 may experience motions (i.e., a translational motion along an axis substantially parallel to the z axis and/or a rotational motion around an axis substantially parallel to the x axis and/or a rotational motion around an axis substantially parallel to the y axis). In some embodiments, the stator 220 may experience motions (i.e., a translational motion along an axis substantially parallel to the z axis and/or a rotational motion around an axis substantially parallel to the x axis and/or a rotational motion around an axis substantially parallel to the y axis). An amount of rotational motion of the rotor 210 and an rotational amount of motion the stator 220 may be controlled by spacing between the long sides 215, 225 of the rotor 210 and the stator 220 and/or spacing between the short sides 217, 227 of the rotor 210 and the stator 220. For example, the rotor 210 may rotate around an axis substantially parallel to the x axis until a long side 215 of the rotor 210 touches the long side of the stator 220.

The rotor 210 and the stator 220 are made from one or more conductive materials. In some embodiments, the rotor 210 and/or the stator 220 are formed by selectively etching a semiconductor material (e.g., silicon) on the micron scale. During operation of the displacement sensor, the rotor 210 and the stator 220 are supplied with a voltage and the capacitance between the rotor 210 and the stator 220 is measured. The operation of the displacement sensor will be described in further detail in FIGS. 2C, 3A, 3B, 9 and 10.

FIG. 2B is a perspective view of a plurality of rotor-stator pairs 205 of the displacement sensor. The rotor-stator pair 200 described in FIG. 2A may be placed in a one-dimensional array or in a two-dimensional array with other rotor-stator pairs 200 to form the plurality of rotor-stator pairs 205. In one embodiment, each rotor-stator pair 200 is separated from another rotor-stator pair 200 by a gap (or open space). In other embodiments, each rotor-stator pair 200 is positioned directly next to an adjacent rotor-stator pair 200 with each rotor-stator pair 200 touching the adjacent rotor-stator pair 200. The top sides of the rotors 210 of the rotor-stator pairs 205 may be coupled to the first object and the bottom sides of the stators 220 of the rotor-stator pairs 205 may be attached to the second object.

In one embodiment, the plurality of rotor-stator pairs 205 may be arranged such that the rotors 210 and the stators 220 are placed side-by-side in one direction (e.g., in a row in the y direction) as illustrated in FIG. 2B. In other embodiments (not shown), the plurality of rotor-stator pairs 205 may be arranged such that the rotors 210 and the stators 220 are placed side-by-side in two directions (e.g., in an array with rows in the y direction and columns in the x direction). The plurality of roto-stator pairs 205 provide greater conductive surface area when compared to a single rotor-stator pair 200 in a displacement sensor. An array of rotor-stator pairs 205 provide a means of determining finer movements between the first object and the second object based on capacitance measurements of the array of rotor-stator pairs in a nominal position versus capacitance measurements of the array in a second position as further described in FIG. 2C.

FIG. 2C is a cross section of two positions (i.e., a nominal position 240 and a second position 250) of the rotor-stator pair 200 of FIG. 2A. Each rotor-stator pair 200 in the array may have a nominal position 240 (e.g., a starting position for the rotor 210 and the stator 220 of each rotor-stator pair 200). The nominal position 240 may include a portion of the stator 220 sized to fit within the cavity of the rotor 210 including none of the stator 220. The stator 220 fits within the cavity of the rotor 210 with a gap between the stator 220 and the rotor 210. Capacitance values associated with deviations from the nominal position 240 are used to measure, e.g., translation motion, tip motion, tilt motion, or some combination thereof.

The cross section illustrated in FIG. 2C illustrates a side view of the rotor-stator pair 200 looking along the x direction. In the illustrated embodiment shown in FIG. 2C, the nominal position 240 of the rotor-stator pair 200 includes half of the stator 220 being within the cavity of the rotor 210 and an equal spacing between the long sides 215 of the rotor 210 and the long sides 225 of the stator 220. This nominal position 240 allows for the rotor 210, the stator 220, or both to undergo translational motions (i.e., motions along an axis substantially parallel to the z axis and/or motions along an axis substantially parallel to the y axis) in both positive and negative directions and rotational motions (i.e., rotations around an axis substantially parallel to the x axis) in both positive and negative directions. The second position 250 of the rotor-stator pair 200 depicts the rotor 210 and/or the stator 220 having undergone a translation motion. For example, the rotor 210 may have moved up (i.e., in a direction substantially parallel to the positive z direction) and the stator 220 remained stationary.

During operation of the displacement system as voltage is applied to the rotor 210 and the stator 220 of the rotor-stator pair 200, the displacement sensor may take capacitance measurements in an area 219 between the long sides 215 of the rotor 210 and the long sides 225 of the stator 220. In some embodiments, the displacement sensor utilizes electrodes (e.g., electrical pads) located on a stationary portion of the displacement sensor on a rotor side and on a stator side to measure the capacitance in the area 219. In some embodiments, a first capacitance measurement is taken by the displacement sensor when the rotor-stator pair 200 is in the nominal position 240 and may be provided and stored in a displacement controller (e.g., the displacement controller 160). The displacement sensor may take subsequent capacitance measurements over time as the rotor 210 and/or the stator 220 move relative to each other. For example, the displacement sensor may take a second capacitance measurement in the area 219 between the long sides 215 of the rotor 210 and the long sides 225 of the stator 220 when the rotor-stator pair 200 is in the second position 250. The displacement sensor may provide the second capacitance measurement to the displacement controller.

In some embodiments, the displacement controller may compare the capacitance measurements (i.e., the first capacitance measurement and the second capacitance measurement) with a predetermined lookup table or a predetermined displacement determination model to estimate an amount of displacement between the first object relative to the second object, the second object relative to the first object, or a combination of both. A predetermined lookup table or a predetermined displacement determination model describes the relation between capacitance values and amounts of displacement. For example, the predetermined lookup table and/or the predetermined displacement determination model may identify an amount of displacement of the first object relative to the second object by comparing capacitance values measured by the displacement sensor with the predetermined lookup table (or a predetermined displacement determination model).

In FIG. 2C, during operation of the displacement system, the displacement controller may compare the first capacitance measurement when the rotor-stator pair 200 is in the nominal position 240 and the second capacitance measurement when the rotor-stator pair 200 is in the second position 250 to the predetermined lookup table and/or the predetermined displacement determination model to determine the amount of displacement of the rotor 210 relative to the stator 220.

Figure 3A:
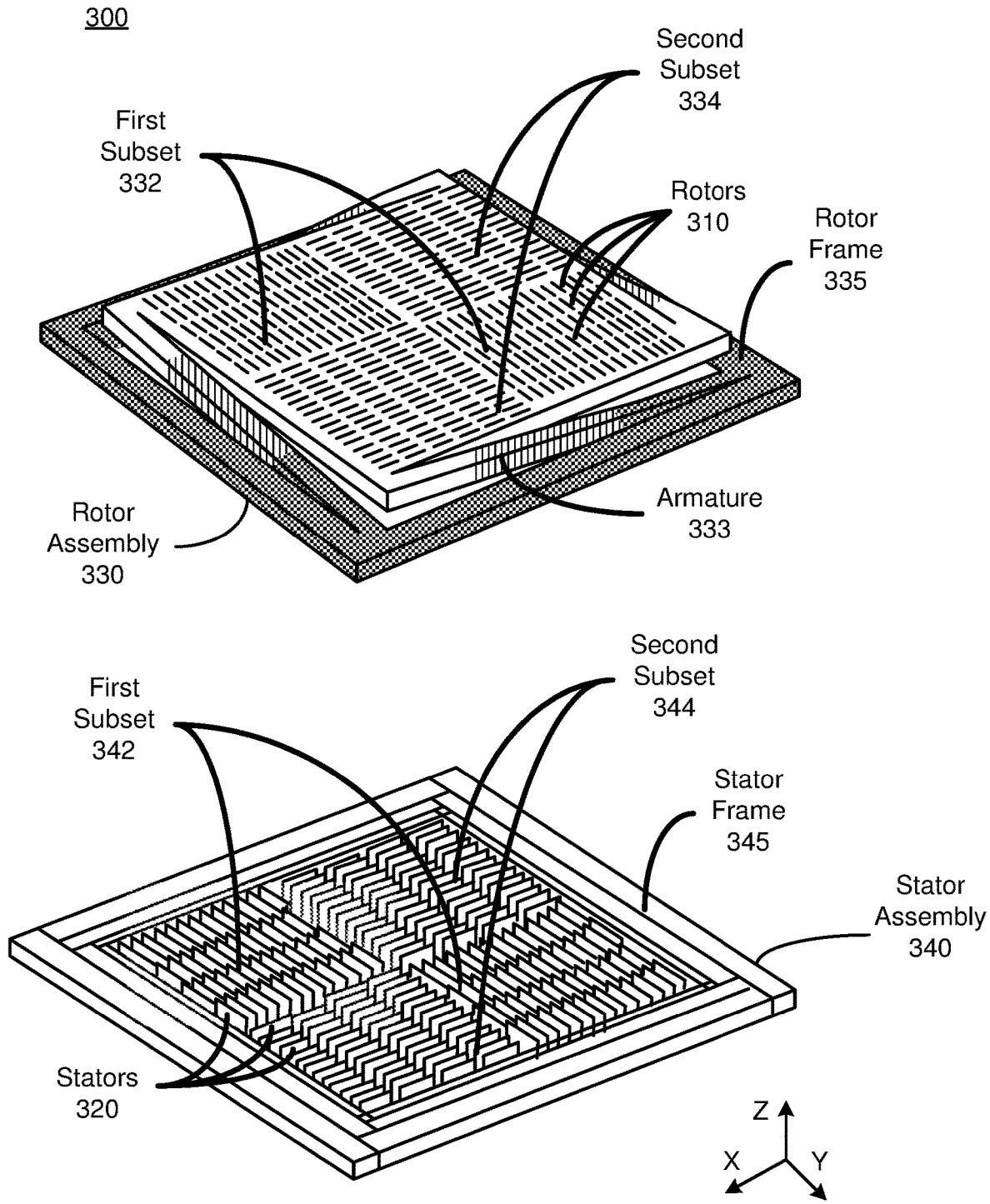
FIG. 3A is an exploded view of a displacement sensor including a rotor assembly and a stator assembly in a first alignment configuration, in accordance with one or more embodiments.

FIG. 3A is an exploded view of a displacement sensor 300 including a rotor assembly 330 and a stator assembly 340 in a first alignment configuration, in accordance with one or more embodiments.

The rotor assembly 330 includes a plurality of rotors 310, armature (e.g., an armature 333), and a rotor frame 335. The plurality of rotors 310 are embodiments of the rotor 210 described in detail above. The plurality of rotors 310 are attached by armature (e.g., the armature 333) on all four sides of the rotor assembly 330 to the rotor frame 335. The rotor frame 335 may be attached to a stator frame 345. The material properties (e.g., flexibility) of the armature is such that the plurality of rotors 310 have some freedom of translational movement in a direction substantially parallel to the z direction (both in the positive and negative directions), in a direction substantially parallel to the x direction (both in the positive and negative directions), and in a direction substantially parallel to the y direction (both in the positive and negative directions) and have some freedom of rotational movement around an axis substantially parallel to the x axis and/or around an axis substantially parallel to the y axis. For example, the armature 333 may be stiffly tuned (i.e., more rigid) on portions of the armature 333 that are parallel to the x-y plane and less stiffly tuned (i.e., more flexible) on portions of the armature 333 that are parallel to the x-z plane and to the y-z plane. In this example, the plurality of rotors 310 have more freedom of translational movement in a direction substantially parallel to the z direction and have less freedom of translational movement in a direction substantially parallel to the x direction, translational movement in a direction substantially parallel to the y direction, rotational movement around an axis substantially parallel to the x axis, and rotational movement around an axis substantially parallel to the y axis. In another example, the armature 333 may be stiffly tuned on portions of the armature 333 that are parallel to the x-z plane and to the y-z plane and less stiffly tuned on portions of the armature 333 that are parallel to the x-y plane. In this example, the plurality of rotors 310 have less freedom of translational movement in a direction substantially parallel to the z direction and have more freedom of translational movement in a direction substantially parallel to the x direction, translational movement in a direction substantially parallel to the y direction, rotational movement around an axis substantially parallel to the x axis and rotational movement around an axis substantially parallel to the y axis.

The stator assembly 340 includes a plurality of stators 320 and the stator frame 345. The plurality of stators 320 are embodiments of the stator 220 described in detail above. The stator frame 345 encompasses the plurality of stators 320 and may be attached to an object (e.g., the object 120). In some embodiments, the displacement sensor may have a length and width ranging from a few hundred micrometers to a few millimeters and a thickness ranging from approximately 500 micrometers to two millimeters. For example, the rotor assembly 330 and the stator assembly 340 may have the same dimensions (i.e., 700 micrometers×700 micrometers by 0.6 millimeters).

In FIG. 3A, both the plurality of rotors 310 and the plurality of stators 320 are arranged in the first alignment configuration. The first alignment configuration includes four groupings of the plurality of rotors 310 and the plurality of stators 320. A grouping of rotors 310 include one or more rotors 310. A grouping of stators 320 include one or more stators 320. As shown on FIG. 3A, two of the groupings include a first subset 332 of the plurality of rotors 310 and a first subset 342 of the plurality of stators 320 aligned with the long sides of the rotors 310 and the long sides of the stators 320 parallel to the y-z plane. The other two groupings include a second subset 334 of the plurality of rotors 310 and a second subset 344 of the plurality of stators 320 aligned with the long sides of the rotors 310 and the long sides of the stators 320 parallel to the x-z plane. The plurality of rotors 310 and the plurality of stators 320 are aligned such that each stator of the plurality of stators 320 fits into a cavity of its corresponding rotor of the plurality of rotors 310 during translational motions along the axis of motion (i.e., along the z axis) forming rotor-stator pairs (e.g., the rotor-stator pairs 205).

During operation of the displacement system, the plurality of rotors 310 and the plurality of stators 320 are supplied with a voltage and the displacement sensor 300 measures capacitance between the long sides of each rotor of the plurality of rotors 310 and the long sides of each stator of the plurality of stators 320 in each rotor-stator pair over time. For example, during a nominal position (e.g., the nominal position 240) of the rotor-stator pairs, the displacement sensor 300 measures a first capacitance value for each rotor-stator pair. As the first object and/or second object move relative to the other, the displacement sensor 300 continues to measure the capacitance values over time. The displacement sensor 300 may measure a second capacitance value for each rotor-stator pair, a third capacitance value for each rotor-stator pair, and so on. The capacitance values are provided to and stored in a displacement controller (e.g., the displacement controller 160). The displacement controller determines an amount of displacement (e.g., amounts of translational motion and/or amounts of rotational motion) that the rotor assembly 330 and/or the stator assembly 340 have undergone based on the capacitance measurement values.

In one embodiment, the displacement controller may group the capacitance measurement values. For example, the capacitance measurements of each rotor-stator pair in each row of rotor-stator pairs in each grouping may be averaged. In another example, the capacitance measurements of each rotor-stator pair in each column of rotor-stator pairs in each grouping may be averaged. In another example, each rotor-stator pair in two, three, four, or N number of rows in each grouping may be averaged. In this example, each rotor-stator pair in a same number of columns in each grouping may be averaged. Thus, keeping the number of rotor-stator pairs in each grouping equivalent. In other examples, every second, third, fourth, or Nth pair in each row of rotor-stator pairs in each grouping may be averaged. In another example, every second, third, fourth, or Nth pair in each column of rotor-stator pairs in each grouping may be averaged. In some embodiments, the displacement controller may utilize each individual capacitance measurement of each rotor-stator pair.

The displacement controller may compare the capacitance values to a predetermined lookup table and/or a predetermined displacement determination module. In some embodiments, the displacement controller may compare the averaged capacitance values to the predetermined lookup table and/or the predetermined displacement determination model to determine the amount of displacement that the rotor assembly 330 and/or the stator assembly 340 have undergone. In some embodiments, the capacitance measurements of the rotor-stator pairs of the first subset 322, 342 may be used to determine translational motions (i.e., motion along an axis substantially parallel to the z axis and/or motion along an axis substantially parallel to the x axis) and/or rotational (tilt) motion (i.e., rotation around an axis substantially parallel to the y axis). In some embodiments, the capacitance measurement of the rotor-stator pairs of the second subset 324, 344 may be used to determine translational motions (i.e., motion along an axis substantially parallel to the z axis and/or motion along an axis substantially parallel to the y axis) and/or rotational (tip) motion (i.e., rotation around an axis substantially parallel to the x axis). For example, for determining the rotational motions of the rotor assembly 330 and/or the stator assembly 340 the capacitance measurements may be grouped in each subset by row.

Figure 3B:
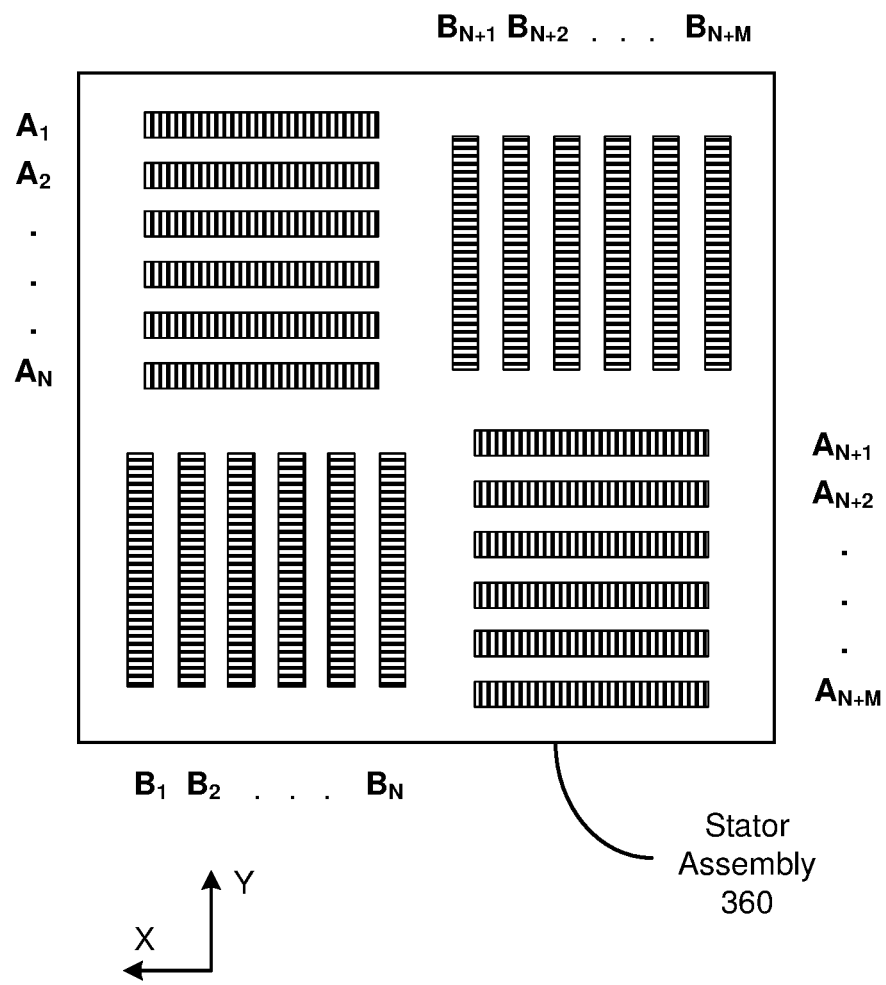
FIG. 3B is a top view of a stator assembly in the first alignment configuration, in accordance with one or more embodiments.

This can be seen in FIG. 3B where a top view 350 of a stator assembly 360 is illustrated in the first alignment configuration. The stator assembly 360 is substantially similar to the stator assembly 340 (i.e., two groupings include stators positioned in rows with each stator parallel to a first plane and a different two groupings include stators positioned in columns with each stator orthogonal to the first plane). The displacement controller receives capacitance measurement values from the displacement sensor and may group the values. The displacement controller may group (e.g., by averaging) each rotor-stator pair capacitance measurement by row and by column. For example, that capacitance measurements determined by each rotor-stator pair in row $A_1$ may be averaged, in row $A_2$ may be averaged, and so on, and the capacitance measurements determined by each rotor-stator pair in column $B_1$, may be averaged, in column $B_2$ may be averaged, and so on.

The averaged capacitance values may be determined at any given time (e.g., when the first object and second object are positioned in a nominal position, in a second position, or in any subsequent position). In one embodiment, the displacement controller may compare the average capacitance values for each row of rotor-stator pairs to the predetermined lookup table to determine an amount of rotational motion around an axis substantially parallel to the y axis (if any) that the rotor assembly and/or the stator assembly 360 may have undergone. Similarly, the displacement controller may compare the average capacitance values of each column of rotor-stator pairs to the predetermined lookup table to determine rotational motions around an axis substantially parallel to the the x axis (if any has taken place). In some embodiments, the displacement controller may compare the change in average capacitance values in each row and/or in each column. For example, a substantially equal change in average capacitance values in all rows ($A_1, A_2, \ldots, A_{N+M}$) and in all columns ($B_1, B_2, \ldots, B_{N+M}$) is determined for a translational motion in the z direction. In another example, a greater change in the average capacitance values for outer rows ($A_1$ and $A_{N+M}$) is determined and the average capacitance values in the columns ($B_1, B_2, \ldots, B_{N+M}$) remain substantially the same for a rotational movement around an axis substantially parallel to the x axis. In another example, a greater change in the average capacitance values for outer columns ($B_1$ and $B_{N+M}$) is determined and the average capacitance values in the rows ($A_1, A_2, \ldots, A_{N+M}$) remain substantially the same for a rotational movement around an axis substantially parallel to the y axis.

The first alignment configuration illustrated in FIGS. 3A and 3B of the displacement sensor may provide high resolution displacement measurement for up to five degrees of motion. Sensitivity of the displacement sensor is increased by increasing the number of rotor-stator pairs in the first alignment configuration. The first alignment configuration allows for differential sensing to take place for translational motions and/or tip motions and/or tilt motions.

In other embodiments (not shown), the plurality of rotors 310 and the plurality of stators 320 may be arranged in other various alignment configurations. The plurality of rotors 310 and the plurality of stators 320 may be arranged in a grouping that includes one or more rows of rotors and corresponding rows of stators. In one example implementation, every other row of rotor-stator pairs is aligned in a first direction (e.g., the long sides of the rotors and stators are aligned with the x-z plane) and the other rows of rotor-stator pairs are aligned orthogonal to the first direction (e.g., the long sides of the rotors and stators are aligned with the y-z plane). In another example implementation, every other rotor-stator pair in each row is aligned in a first direction and the other rotor-stator pairs in each row are aligned orthogonal to the first direction. In further example implementations, any number of rotor-stator pairs in each row may be aligned in a first direction and the other rotor-stator pairs in each row are aligned orthogonal to the first direction. In another example implementation, the rotor-stator pairs are all aligned in a similar direction. This embodiment will be further described in FIG. 4.

Figure 4:
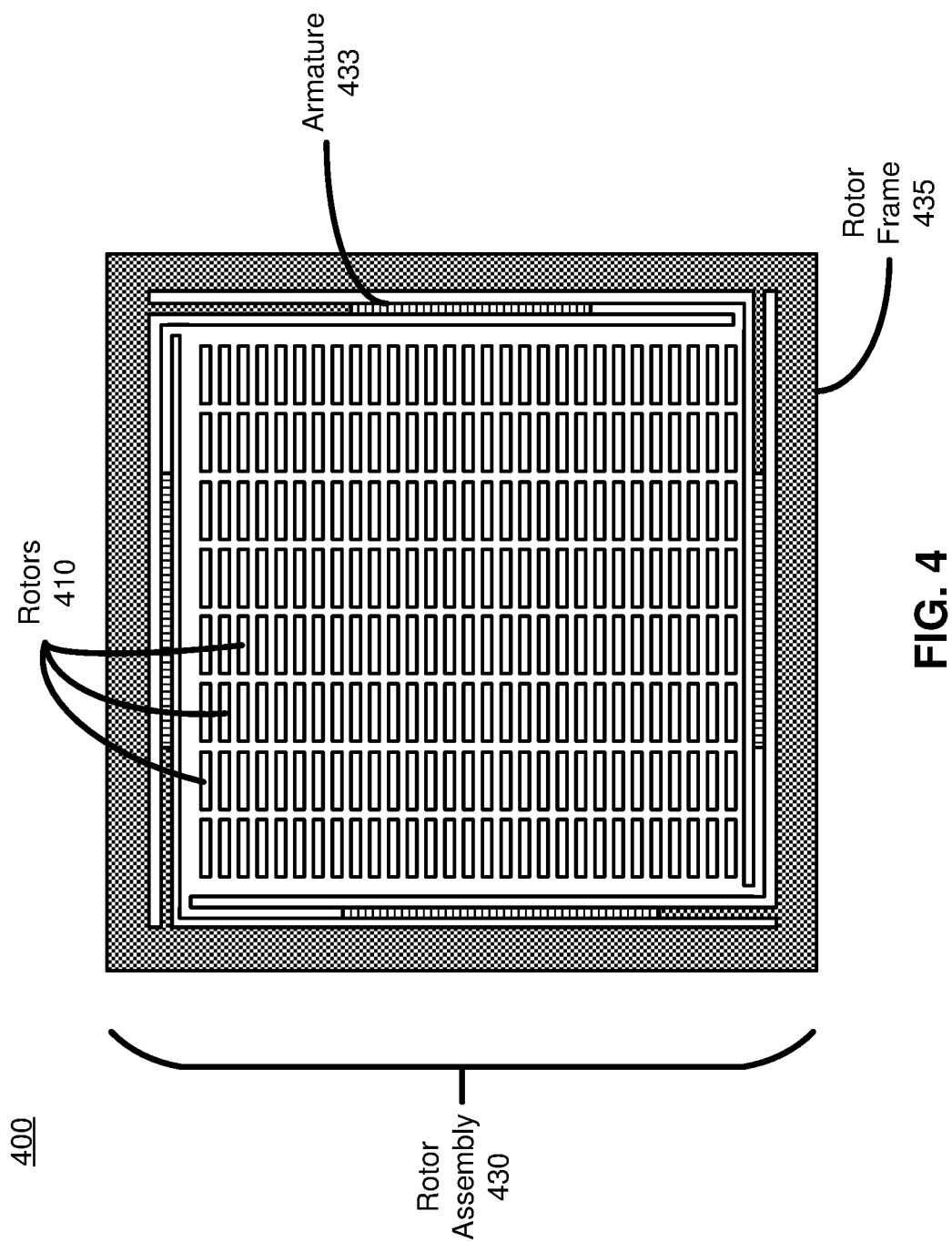
FIG. 4 is a top view of a rotor assembly of a displacement sensor in a second alignment configuration, in accordance with one or more embodiments.

FIG. 4 is a top view 400 of a rotor assembly 430 of a displacement sensor in a second alignment configuration, in accordance with one or more embodiments. The rotor assembly 430 is substantially similar to the rotor assembly 330, except the plurality of rotors 410 are aligned in only direction (i.e. the second alignment configuration). For example, the long sides of the plurality of rotors 410 are aligned parallel to a plane (e.g., the x-z plane). The stator assembly (not shown) of the displacement sensor includes a plurality of stators aligned in the same alignment configuration as the plurality of rotors 410. In the same example, the long sides of the plurality of stators are aligned such that each stator fits within a corresponding rotor of the plurality of rotors 410. The displacement sensor with the rotors 410 and the stators in this alignment configuration may determine a translation motion and/or two rotational motions. For example, a translational motion (i.e., a motion along an axis substantially parallel to the z axis) of the rotor assembly 430 relative to the stator assembly may be determined when each stator in the plurality of stators is provided with a substantially similar voltage across the entire stator. In another example, a translational motion (e.g., motion along an axis substantially parallel to the z axis) and one or more rotational motions (e.g., a rotation around an axis substantially parallel to the y axis and/or a rotation around an axis substantially parallel to the x axis) of the rotor assembly 430 relative to the stator assembly may be determined when portions of some or all of the stators in the plurality of stators is provided with differing voltages.

Figure 5A:
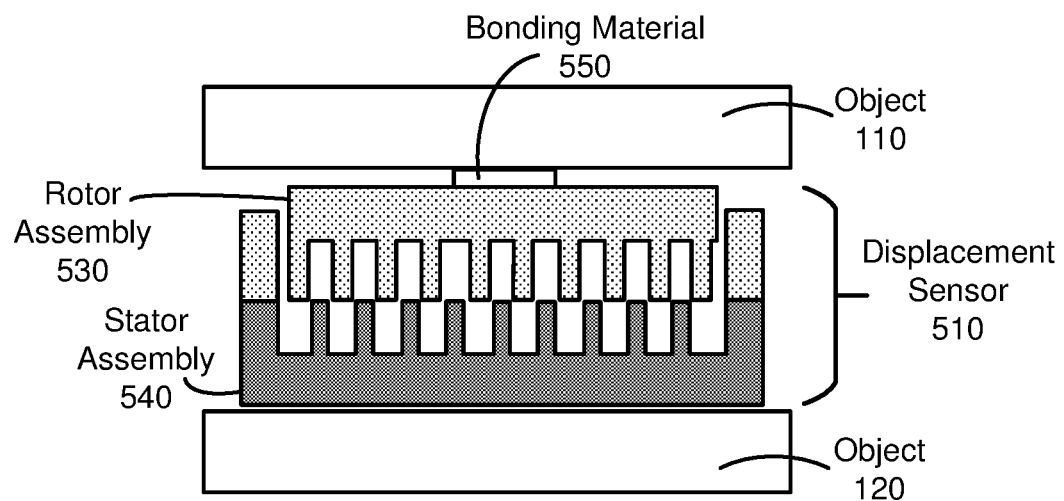
FIG. 5A is a cross section of a displacement sensor attached to two objects in a first attachment configuration, in accordance with one or more embodiments.

FIG. 5A is a cross section of a displacement sensor 510 attached to two objects (i.e., the object 110 and the object 120) in a first attachment configuration, in accordance with one or more embodiments. The displacement sensor 510 is an embodiment of the displacement sensor 105 of FIGS. 1A and 1B and/or the displacement sensor 300 of FIG. 3A. The displacement sensor 510 includes a rotor assembly 530 and a stator assembly 540. The rotor assembly 530 is substantially similar to the rotor assemblies 330, 430 previously discussed and may include a plurality of rotors arranged in any alignment orientation previously discussed. The stator assembly 540 may include a plurality of stators arranged in a matching alignment configuration to the rotor assembly 530. For simplicity, in FIG. 5A, the plurality of rotors and the plurality of stators are arranged with their long sides parallel to a plane similar to the second alignment configuration discussed in FIG. 4. In the first attachment configuration, the rotor assembly 530 is attached to the object 110 by a bonding material 550 (e.g., an adhesive, a PDMS, etc.). In one embodiment shown in FIG. 5A, the bonding material 550 may be applied to a portion of the rotor assembly 530. In another embodiment (not shown), the bonding material 530 may be applied to the entire top side of the rotor assembly 530. In the first attachment configuration, the stator assembly 540 may be attached via a stator frame (e.g., the stator frame 345) to the object 120.

Figure 5B:
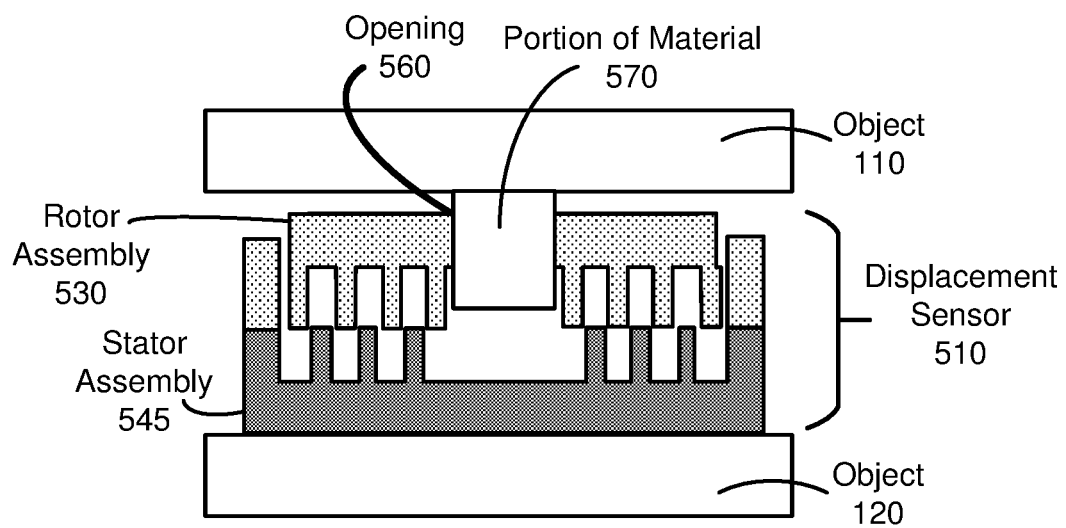
FIG. 5B is a cross section of a displacement sensor attached to two objects in a second attachment configuration, in accordance with one or more embodiments.

FIG. 5B is a cross section of the displacement sensor 510 attached to two objects (i.e., the object 110 and the object 120) in a second attachment configuration, in accordance with one or more embodiments. In the second attachment configuration, the rotor assembly 530 is coupled to the object 110 by an opening 560 in the rotor assembly 530 that is connected to a portion of material 570 extending from the object 110. The portion of material 570 may be solid or hollow. The portion of material 570 during translational motions along the axis of motion (e.g., along an axis substantially parallel to the z axis) is restricted from colliding with the stator assembly 545. For example, the rotor assembly 530 is affixed to a rotor frame (e.g., the rotor frame 335) by armature (e.g., armature 333) that restricts the amount of translational motion the rotor assembly 530 may undergo. In the second attachment configuration, the stator assembly 545 may be attached via the stator frame to the object 120.

Figure 6:
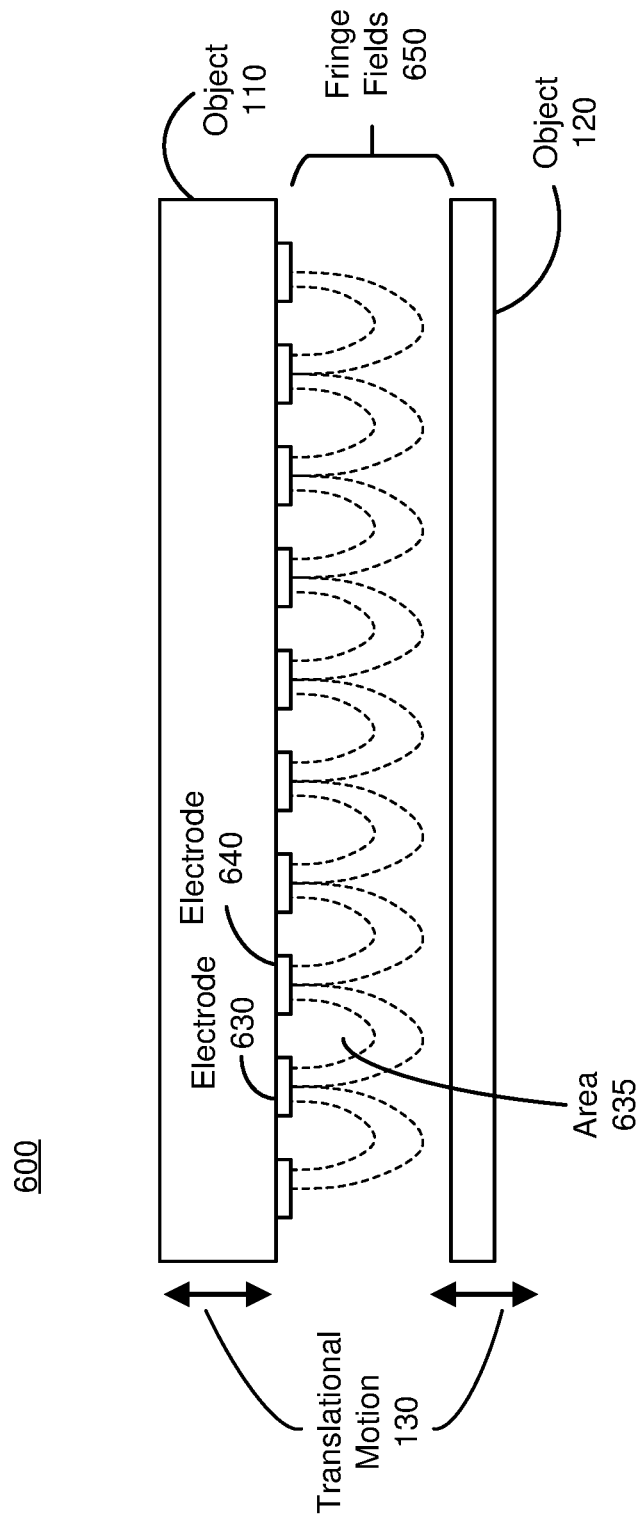
FIG. 6 is a cross section of a displacement sensor utilizing fringe field sensing, in accordance with one or more embodiments.

FIG. 6 is a cross section of a displacement sensor 600 utilizing fringe field sensing, in accordance with one or more embodiments. Similar to the displacement sensors described in FIGS. 1A, 1B, 3A, and 4, the displacement sensor 600 measures capacitance between conductive objects. The displacement sensor 600 utilizing fringe field sensing includes a plurality of electrodes (e.g., an electrode 630 and an electrode 640) coupled to the object 110. The plurality of electrodes may be coupled to the object 110 in a one-dimensional array or in a two-dimensional array. In other embodiments (not shown), the plurality of electrodes may be coupled to the object 120. Each electrode is connected to a voltage source that provides voltage to the electrode. As the voltage is applied to the electrodes, electric fields (i.e., fringe fields 650) are created in the areas (e.g., an area 635) between the electrodes. The capacitance is measured between each electrode in the fringe fields 650. For example, as the area 635 between the electrode 630 and the electrode 640 changes (e.g., increases or decreases) due to a translational motion 130 of the object 110 relative to the object 120, a translational motion 130 of the object 120 relative to the object 110, or some combination thereof, the displacement sensor 600 measures changes in capacitance of the fringe fields 650. The displacement sensor 600, similar to the previously described displacement sensors, provides the capacitance measurements to a displacement controller (e.g., the displacement controller 160) to determine the amount of translation motion 130 that the object 110 and/or the object 120 underwent. In one example, the capacitance measurements of each electrode are provided to the displacement controller. In another example, the capacitance measurements are averaged over a row (or over a column) and the average capacitance measurements are provided to the displacement controller. The displacement controller may compare the capacitance values to a predetermined lookup table or a predetermined displacement determination model to determine the amount of translational displacement the object 110 and/or the object 120 underwent.

Figure 7:
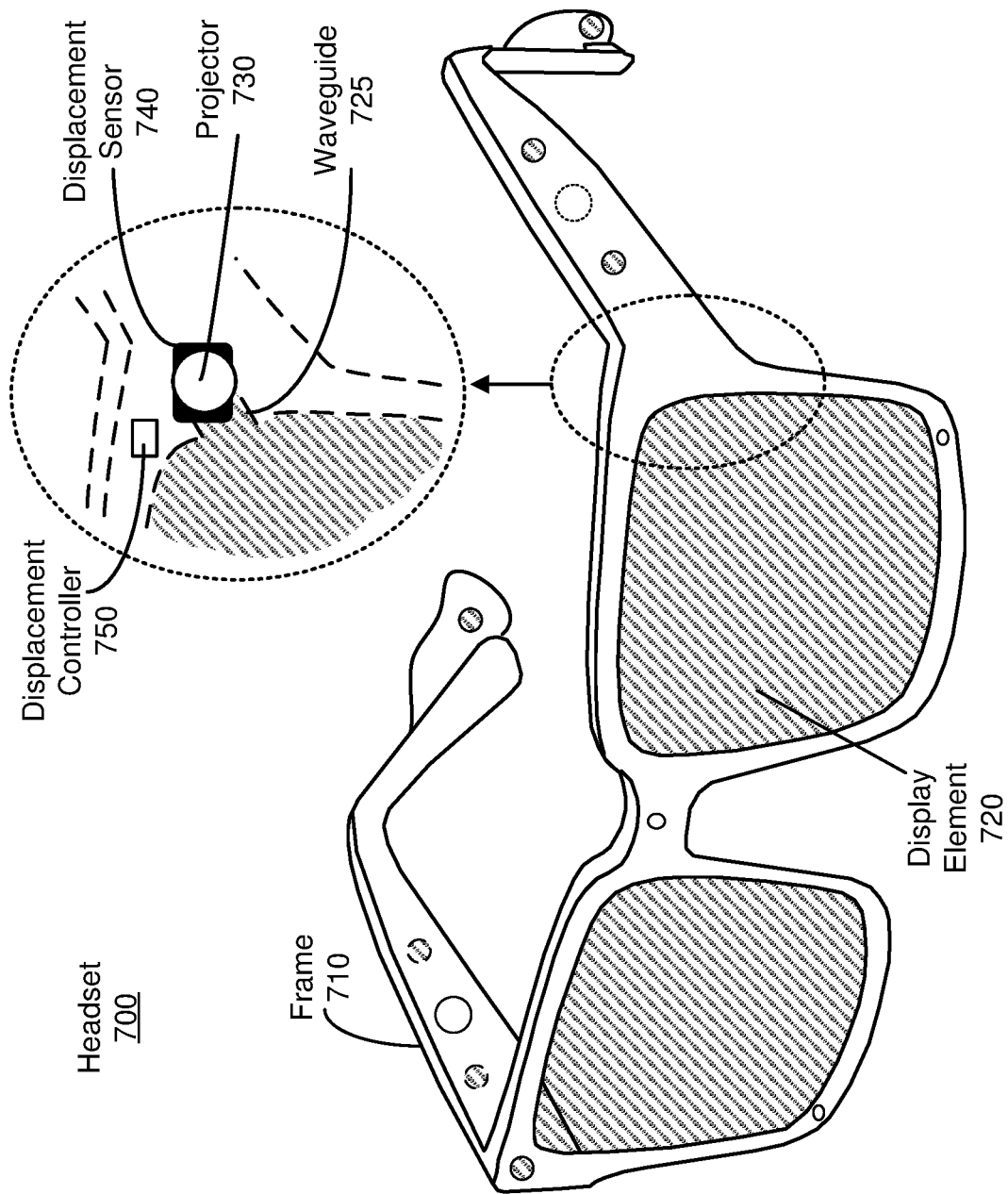
FIG. 7 is a perspective view of a headset implemented as an eyewear device, in accordance with one or more embodiments.

FIG. 7 is a perspective view of a headset 700 implemented as an eyewear device, in accordance with one or more embodiments. In some embodiments, the eyewear device is a near eye display (NED). In general, the headset 700 may be worn on the face of a user such that content (e.g., media content) is presented using a display assembly and/or an audio system. However, the headset 700 may also be used such that media content is presented to a user in a different manner. Examples of media content presented by the headset 700 include one or more images, video, audio, or some combination thereof. The headset 700 includes a frame 710, and may include, among other components, a display assembly including one or more display elements 720 and one or more waveguides 725, one or more projectors 730, one or more displacement sensors 740, and a displacement controller 750. While FIG. 7 illustrates the components of the headset 700 in example locations on the headset 700, the components may be located elsewhere on the headset 700, on a peripheral device paired with the headset 700, or some combination thereof. Similarly, there may be more or fewer components on the headset 700 than what is shown in FIG. 7.

The frame 710 holds the other components of the headset 700. The frame 710 includes a front part that holds the one or more display elements 720 and end pieces (e.g., temples) to attach to a head of the user. The front part of the frame 710 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 720 provide light to a user wearing the headset 700. As illustrated the headset includes a display element 720 for each eye of a user. In some embodiments, a display element 720 generates image light that is provided to an eyebox of the headset 700. The eyebox is a location in space that an eye of user occupies while wearing the headset 700. For example, a display element 720 may be a waveguide display that includes one or more waveguides 725. A waveguide display includes a light source (e.g., one or more projectors 730) and one or more waveguides 725. The waveguides 725 and the projectors 730 are positioned in the interior of the frame 710. Light from the projectors 730 is in-coupled into the one or more waveguides 725 which outputs the light in a manner such that there is pupil replication in an eyebox of the headset 700. Thus, the waveguides 725 guide the light output by the projectors 730. In-coupling and/or outcoupling of light from the one or more waveguides 725 may be done using one or more diffraction gratings. In some embodiments, the one or more projectors 730 include a red projector, a blue projector, and a green projector. Each projector 730 in-couples light into the waveguides 725 (e.g., the red projector in-couples light into one waveguide, the blue projector in-couples light into one waveguide, and the green projector in-couples light into one waveguide).

In some embodiments, the waveguide display includes a scanning element (e.g., waveguide, mirror, etc.) that scans light from the projector 730 as it is in-coupled into the one or more waveguides 725. Note that in some embodiments, one or both of the display elements 720 are opaque and do not transmit light from a local area around the headset 700. The local area is the area surrounding the headset 700. For example, the local area may be a room that a user wearing the headset 700 is inside, or the user wearing the headset 700 may be outside and the local area is an outside area. In this context, the headset 700 generates VR content. Alternatively, in some embodiments, one or both of the display elements 720 are at least partially transparent, such that light from the local area may be combined with light from the one or more display elements to produce AR and/or MR content.

In some embodiments, the display element 720 may include an additional optics block (not shown). The optics block may include one or more optical elements (e.g., lens, Fresnel lens, etc.) that direct light from the display element 720 to the eyebox. The optics block may, e.g., correct for aberrations in some or all of the image content, magnify some or all of the image, or some combination thereof.

The one or more displacement sensors 740 are substantially similar to the displacement sensors discussed in more detail above. The displacement sensors 740 are positioned in the interior of the frame 710. In FIG. 7, the displacement sensor 740 is illustrated as being positioned in between the projector 730 and the waveguide 725 (i.e., the displacement sensor 740 is coupled to the projector 730 and the waveguide 725). In this illustrated embodiment, the projector 730 may experience motion in a similar manner as the object 110 and the waveguide 725 may experience motion in a similar manner as the object 120. In some embodiments (not shown), a displacement sensor 740 is positioned between each projector 730 (e.g., a red projector) and its associated waveguide 725. In one embodiment, the displacement sensor 740 measures the capacitance between a rotor assembly attached to the projector 730 and a stator assembly attached to the waveguide 725. In another embodiment, the displacement sensor 740 is a fringe field sensor (e.g., the fringe field sensor 600) and measures the capacitance in the areas between electrodes. The measured capacitance values are provided by the displacement sensor 740 to the displacement controller 750.

The displacement controller 750 is substantially similar to the displacement controller 160 described in more detail in FIGS. 1A-1B. The displacement controller 750 determines an amount of motion of the projector 730 relative to the waveguide 725. In some embodiments, the displacement controller 750 provides displacement correction instructions based on the determined amount of motion. For example, in some embodiments, the projector 730 may tip and/or tilt relative to the waveguide 725 inducing disparity in the image presented by the left and right display elements 720. The displacement controller 750 determines displacement correction instructions to adjust the projector 730 accordingly. In another example, when the projector 730 is mounted on the eyebox side of the headset 700, any tip and/or tilt motion of the projector 730 and waveguide 725 induces disparity in the image presented. The displacement controller 750 determines displacement correction instructions to adjust the projector 730 and waveguide 725 accordingly. In some embodiments, the rotor assembly of the displacement sensor 740 is attached to or part of a motor and the displacement controller 750 may provide displacement correction instructions to the motor. The displacement correction instructions may provide an amount of motion and a direction of motion the motor should move the rotor assembly to correct any amount of displacement determined by the displacement controller 750. In some embodiments, the displacement controller 750 may provide displacement correction instructions (e.g., a pixel shift amount) to the projector 730.

In an embodiment (not shown), the displacement sensors 740 may be positioned between the waveguides 725 and the frame 710 (i.e., the displacement sensors are coupled to the waveguides 725 and the frame 710). In an example implementation, two or more displacement sensors 740 are located between a waveguide 725 and the frame 710 and at least one displacement sensor 740 is located between a projector 730 and a waveguide 725. In this embodiment, the displacement controller 750 determines an amount of displacement between the waveguide 725 and the frame 710 and between the waveguide(s) 725 and the projector(s) 730.

Figure 8A:
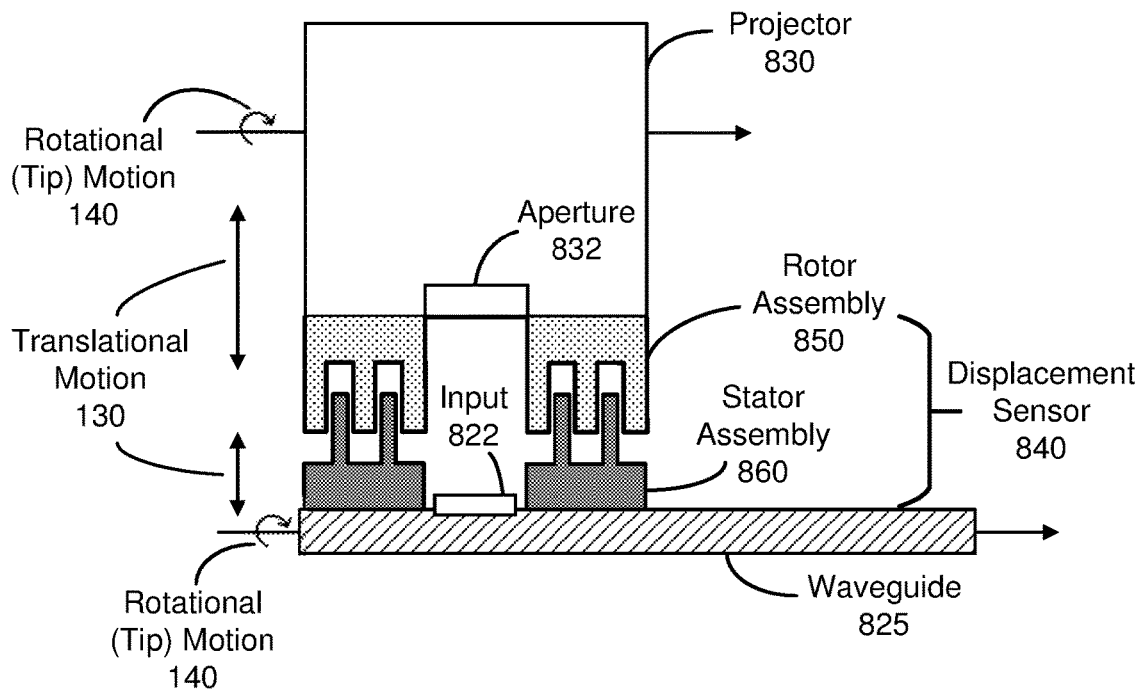
FIG. 8A illustrates a displacement sensor measuring a translational motion and a first rotational motion between a projector and a waveguide, in accordance with one or more embodiments.

FIG. 8A illustrates the displacement sensor 840 measuring the translational motion 130 and the rotational (tip) motion 140 between a projector 830 and a waveguide 825, in accordance with one or more embodiments. The projector 830 outputs image light through an aperture 832 towards the waveguide 825. The image light is input into the waveguide 825 at an input 822 (e.g., a diffraction grating). In the illustrated embodiment of FIG. 8A, the displacement sensor 840 includes a rotor assembly 850 and a stator assembly 860. The rotor assembly 850 and the stator assembly 860 are embodiments of earlier described rotor assemblies and stator assemblies of FIGS. 3A-4. The displacement sensor 840 measures capacitance between the individual rotors of the rotor assembly 850 and the individual stators of the stator assembly 860 and provides the measured capacitances to the displacement controller (not shown). The displacement controller determines the amount of translational motion 130 and/or rotational (tip) motion 140 the projector 830 may have undergone relative to the waveguide 825, the amount of translational motion 130 and/or rotational (tip) motion 140 the waveguide 825 may have undergone relative to the projector 830, or some combination thereof.

Figure 8B:
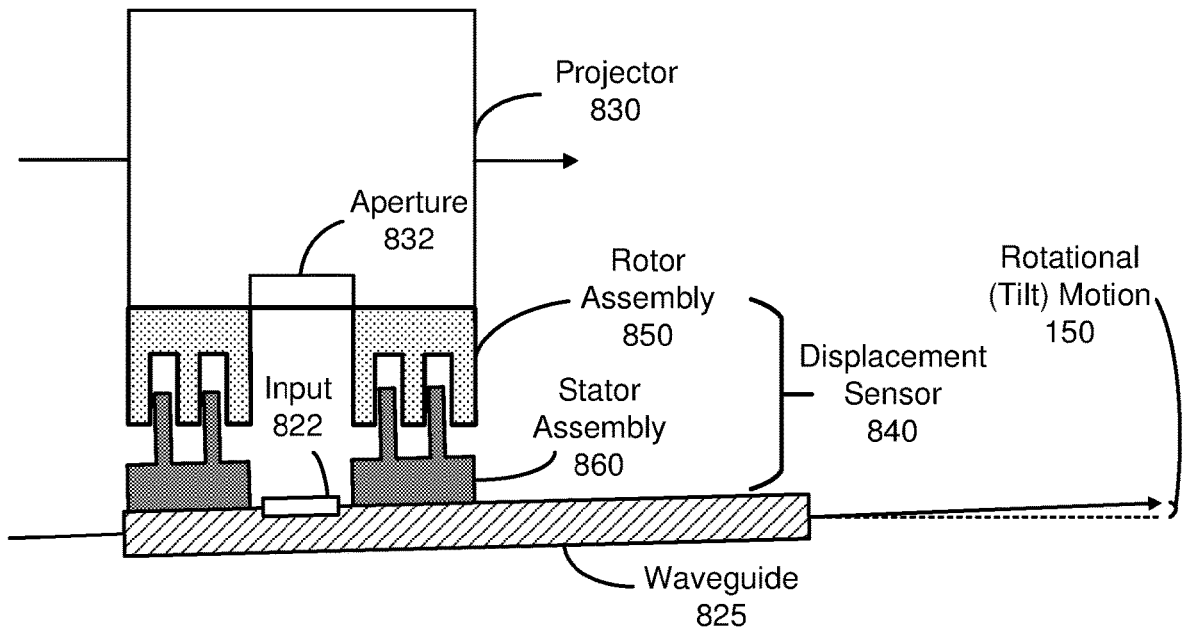
FIG. 8B illustrates the displacement sensor of FIG. 8A measuring a second rotational motion between the projector and the waveguide.

FIG. 8B illustrates the displacement sensor 840 of FIG. 8A measuring the rotational (tilt) motion 150 between the projector 830 and the waveguide 825. In the illustrated embodiment shown in FIG. 8B, the rotational (tilt) motion 150 is experienced by the waveguide 825 relative to the projector 830. In other embodiments (not shown), the rotational (tilt) motion 150 may be experienced by the projector 830 relative to the waveguide 825 or may be experienced by both the projector 830 and the waveguide 825.

Figure 9:
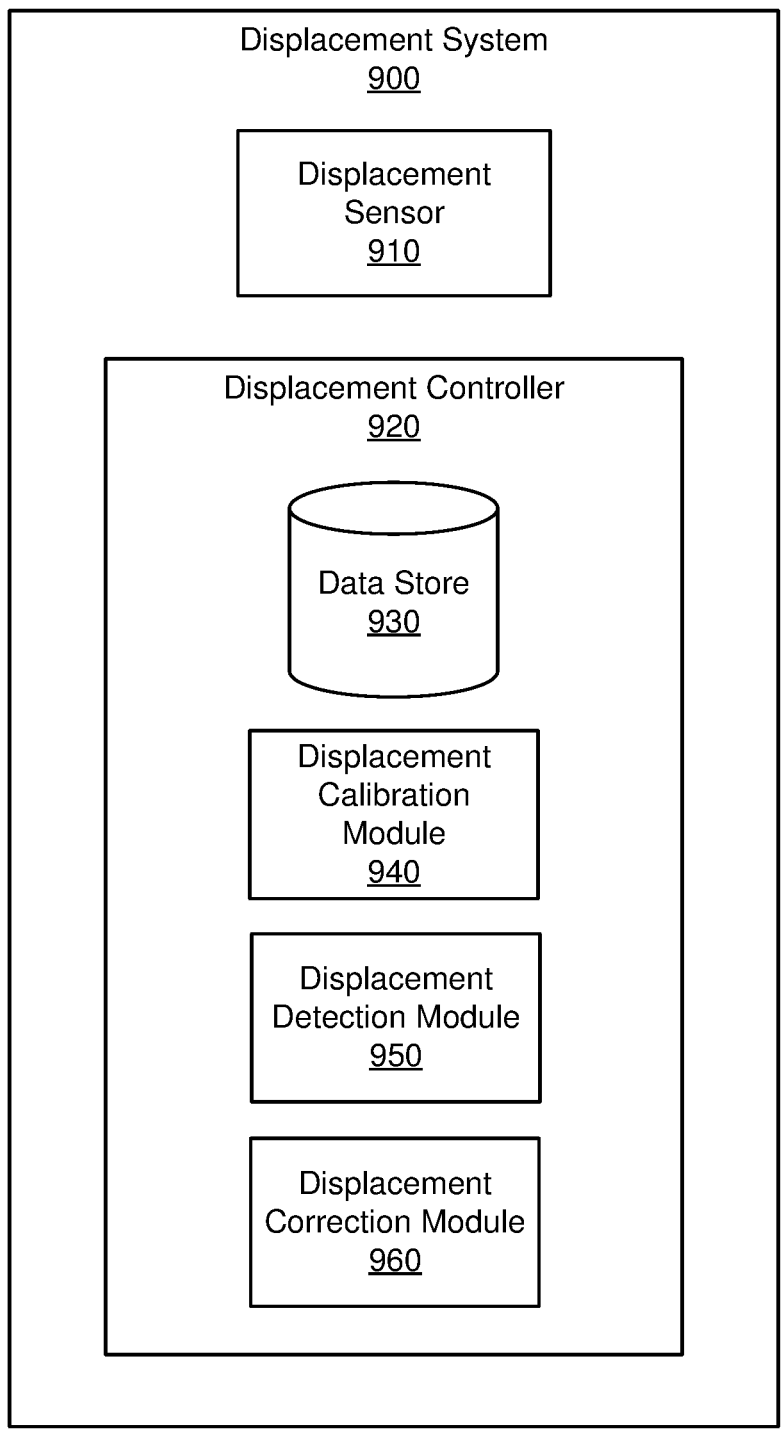
FIG. 9 is a block diagram of a displacement system, in accordance with one or more embodiments.

FIG. 9 is a block diagram of a displacement system 900, in accordance with one or more embodiments. The displacement system 900 determines an amount of displacement between two objects (e.g., between the object 110 and the object 120). In some embodiments, the displacement system 900 corrects the amount of displacement between the two objects. In the embodiment of FIG. 9, the displacement system 900 includes a displacement sensor 910 and a displacement controller 920. Some embodiments of the displacement system 900 have different components than those described here. Similarly, in some cases, functions can be distributed among the components in a different manner than is described here.

The displacement sensor 910 is substantially similar to the displacement sensor embodiments described in further detail above (e.g., the displacement sensor 105, 300, 400, 600, 840). For example, in one embodiment, the displacement sensor 910 measures capacitance between a plurality of rotors coupled to a first object and a plurality of stators coupled to a second object as both rotors and stators are being supplied with a voltage. In another example embodiment, the displacement sensor 910 measures capacitance in fringe fields between a plurality of electrodes coupled to a first object and a second object as the electrodes are being supplied with a voltage. The capacitance measurements measured by the displacement sensor 910 are provided to the displacement controller 920. In one embodiment, the displacement sensor 910 is located inside a headset (e.g., the headset 700), the first object may be a projector (e.g., the projector 730), and the second object may be a waveguide (e.g., the waveguide 725).

The displacement controller 920 controls operation of the displacement system 900. In the embodiment of FIG. 6, the displacement controller 920 includes a data store 930, a displacement calibration module 940, displacement detection module 950, and a displacement correction module 960. The displacement controller 920 may be located inside a device (e.g., the headset), in some embodiments. Some embodiments of the displacement controller 920 have different components than those described here.

The data store 930 stores data for use by the displacement system 900. Data in the data store 930 may include nominal position information, nominal position capacitance measurement values, other positional capacitance measurement values, a predetermined lookup table to determine translational, tip, and tilt motions, a predetermined displacement determination model to determine translational, tip, and tilt motions, threshold translational measurements, threshold rotational measurements, amounts of displacement correction, and other data relevant for use by the displacement system 900, or any combination thereof.

The displacement calibration module 940 generates and/or updates the predetermined lookup table or the predetermined displacement determination model. In one embodiment, the displacement sensor 910 continuously measures capacitance values during the calibration sequence. For example, the displacement sensor 910 measures the capacitance values during known positions and/or known amounts of displacement of the two objects. The sample capacitance values at known amounts of displacement may be combined into the lookup table and/or the model. The displacement calibration module 940 updates the model during subsequent displacement determinations.

The displacement detection module 950 is configured to determine the amount of displacement between two objects based in part on the capacitance measurements from the displacement sensor 910. The displacement detection module 950 may analyze the capacitance measurements to determine the amount of displacement between the two objects. In one embodiment, the displacement detection module 950 may compare first capacitance measurements (taken during a nominal position of the first object and the second object) and subsequent capacitance measurements (taken at one or more later times during subsequent positions of the first object and the second object) with the predetermined lookup table or the predetermined displacement detection model. The comparison of capacitance values measured by the displacement sensor 910 and the capacitance values included in the lookup table or model, provide the displacement detection module 950 with an amount of displacement between the two objects. The amount of displacement determined by the displacement detection module 950 may include a translation motion and/or one or more rotational motions.

The displacement correction module 960 is configured to determine an amount of displacement correction needed to adjust one or both objects based on the amount of displacement between the two objects. The displacement correction module 960 may receive the amount of displacement (e.g., the translational displacement, the tip rotational displacement, the tilt rotational displacement, or some combination thereof) from the displacement detection module 950 and correct the amount of displacement. In some embodiments, the displacement correction module 960 compares the amount of displacement with a threshold translational displacement measurement, a threshold tip rotational measurement, and a threshold tilt rotational measurement. For example, an amount of translational displacement, an amount of tip displacement, and an amount of tilt displacement determined by the displacement detection module 950 may be compared with a threshold translational displacement measurement, a threshold tip rotational measurement, and a threshold tilt rotational measurement by the displacement correction module 960. If the translational displacement measurement, the tip displacement measurement, and/or the tilt displacement measurement is greater than or equal to its corresponding threshold displacement measurement, the displacement correction module 960 determines an amount of displacement correction (i.e., an amount of translational motion correction, an amount of tip rotational motion correction, an amount of tilt rotational motion correction, or some combination thereof) needed position the two objects in a nominal position. In one embodiment, the displacement correction module 960 may provide the displacement correction as a set of instructions to a motor attached to the one or more of the objects. The instructions may provide an amount and a direction of motion the motor should move one or more of the objects to correct for the displacement. In embodiments where the displacement sensor 910 is located inside a headset, the first object is a projector, and the second object is a waveguide, the displacement correction module 960 may provide the displacement correction as a set of instructions to the projector. The instructions may provide a pixel shift amount for the projector to shift some or all of the pixels. The shift adjusts the projected image light of the projector to compensate for the amount of displacement.

Figure 10:
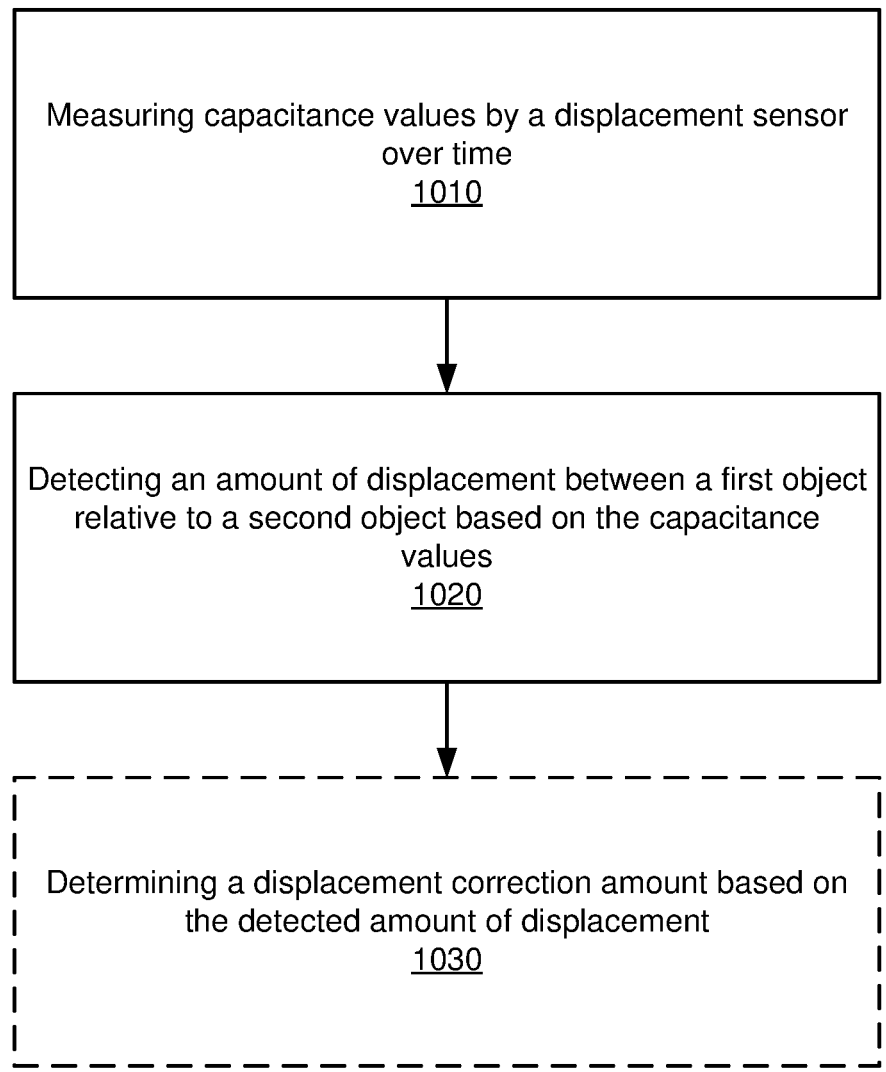
FIG. 10 is a flowchart illustrating a process for determining an amount of displacement between two objects, in accordance with one or more embodiments.

FIG. 10 is a flowchart illustrating a process 1000 for determining an amount of displacement between two objects, in accordance with one or more embodiments. The process shown in FIG. 10 may be performed by components of a displacement system (e.g., the displacement system 900). Other entities may perform some or all of the steps in FIG. 10 in other embodiments. Embodiments may include different and/or additional steps or perform the steps in different orders. For example, the process 1000 may include steps for correcting the amount of displacement between the two objects.

The displacement system measures 1010 capacitance values by a displacement sensor (e.g., the displacement sensor 910) over time. The displacement sensor is coupled to a first object that is substantially similar to the object 110 and is coupled to a second object that is substantially similar to the object 120.

The displacement system detects 1020 an amount of displacement of the first object relative to the second object based on the capacitance values. The amount of displacement may include any amount of translational motion and/or rotational motion of the first object relative to the second object, of the second object relative to the first object, or of both objects relative to each other. In one embodiment, a displacement controller (e.g., the displacement controller 920) may receive capacitance measurements from the displacement sensor. In some embodiments, the displacement controller may compare the capacitance measurements over time to determine the amount of displacement of the first object relative to the second object. The capacitance values increase or decrease as a function of position of the first object relative to the second object with the capacitance being inversely affected by distance and directly affected by conductive surface area. In one example, the displacement system may determine the amount of change between a first capacitance measurement value and a subsequent capacitance measurement value detected by the displacement sensor. The amount of change is related to an amount of motion undergone by the first object relative to the second object, by the second object relative to the first object, or some combination of both.

The displacement system determines 1030 a displacement correction amount based on the detected amount of displacement. In one embodiment, one or more of the first object and the second object may be adjusted (e.g., moved) to correct the amount of displacement. In one example, the displacement controller provides instructions to a motor to adjust the positioning of the first object and/or the second object to correct the displacement. In an embodiment with the displacement system integrated onto a headset device, the displacement controller determines a projector (e.g., the projector 730, 830) has rotated (i.e., tipped) by one degree and the displacement controller instructs a motor attached to the projector to adjust the positioning of the projector by rotating (tipping) the projector by one degree in the opposite direction. In the same embodiment with the displacement system integrated onto a headset device, the displacement controller may provide instructions (e.g., pixel shift amounts) to the projector to compensate for the amount of displacement determined by the displacement controller.

Figure 11:
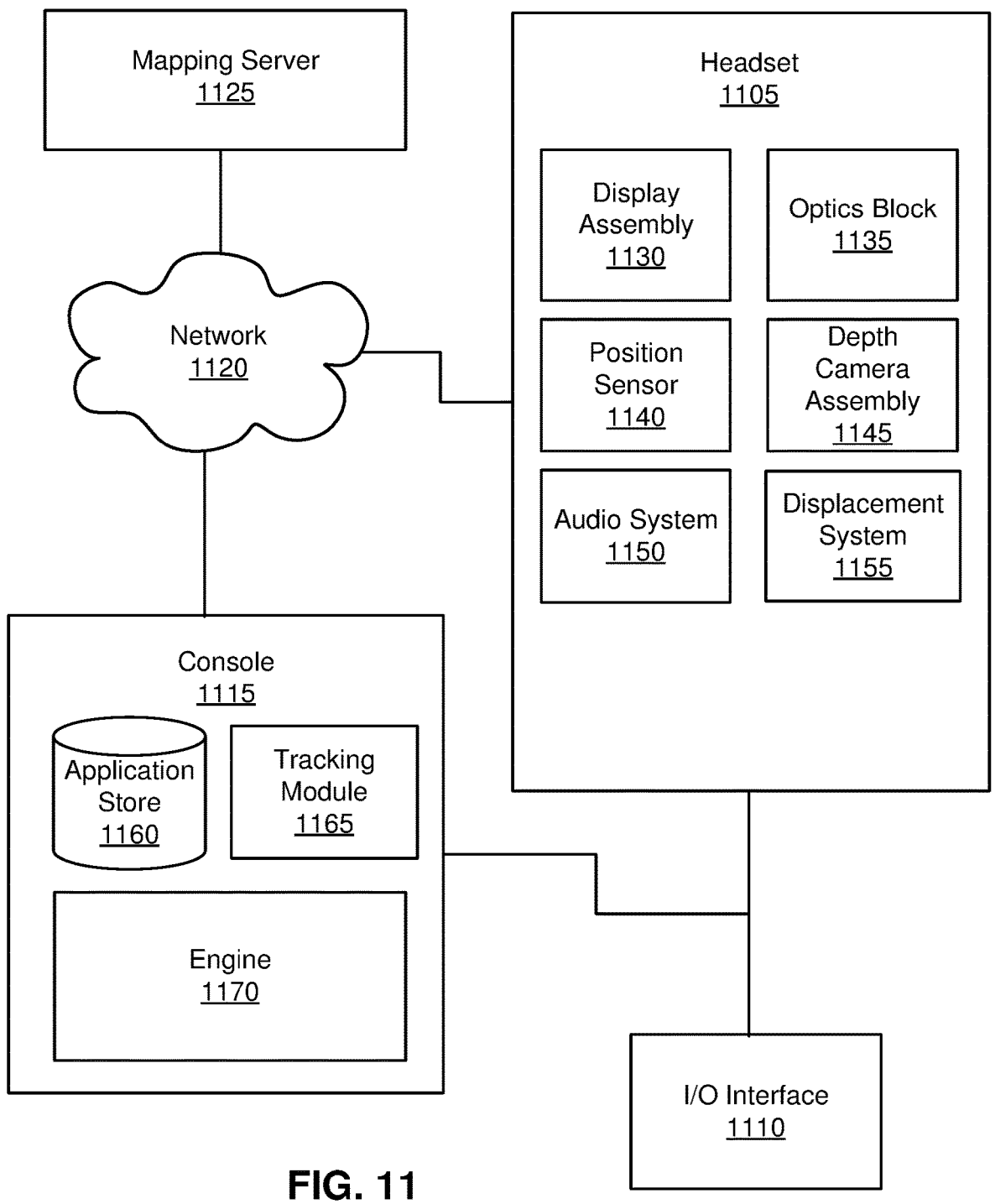
FIG. 11 is a system that includes a headset, in accordance with one or more embodiments.

FIG. 11 is a system 1100 that includes a headset 1105, in accordance with one or more embodiments. In some embodiments, the headset 1105 may be the headset 700 of FIG. 7. The system 1100 may operate in an artificial reality environment (e.g., a virtual reality environment, an augmented reality environment, a mixed reality environment, or some combination thereof). The system 1100 shown by FIG. 11 includes the headset 1105, an input/output (I/O) interface 1110 that is coupled to a console 1115, the network 1120, and the mapping server 1125. While FIG. 11 shows an example system 1100 including one headset 1105 and one I/O interface 1110, in other embodiments any number of these components may be included in the system 1100. For example, there may be multiple headsets each having an associated I/O interface 1110, with each headset and I/O interface 1110 communicating with the console 1115. In alternative configurations, different and/or additional components may be included in the system 1100. Additionally, functionality described in conjunction with one or more of the components shown in FIG. 11 may be distributed among the components in a different manner than described in conjunction with FIG. 11 in some embodiments. For example, some or all of the functionality of the console 1115 may be provided by the headset 1105.

The headset 1105 includes the display assembly 1130, an optics block 1135, one or more position sensors 1140, a depth camera assembly (DCA) 1145, an audio system 1150, and a displacement system 1155. Some embodiments of headset 1105 have different components than those described in conjunction with FIG. 11. Additionally, the functionality provided by various components described in conjunction with FIG. 11 may be differently distributed among the components of the headset 1105 in other embodiments or be captured in separate assemblies remote from the headset 1105.

The display assembly 1130 displays content to the user in accordance with data received from the console 1115. The display assembly 1130 displays the content using one or more display elements (e.g., the display elements 720). A display element may be, e.g., a waveguide display. In one example implementation, the display assembly 1130 includes one or more light sources (e.g., one or more projectors 730) to project image light and one or more waveguides (e.g. waveguides 725) to guide the image light towards the display elements. The display assembly 1130 may maintain the relative positioning between the one or more projectors and the one or more waveguides by using the displacement system 1155. Note in some embodiments, the display elements may also include some or all of the functionality of the optics block 1135.

The optics block 1135 may magnify image light received from the electronic display, corrects optical errors associated with the image light, and presents the corrected image light to one or both eyeboxes of the headset 1105. In various embodiments, the optics block 1135 includes one or more optical elements. Example optical elements included in the optics block 1135 include: an aperture, a Fresnel lens, a convex lens, a concave lens, a filter, a reflecting surface, or any other suitable optical element that affects image light. Moreover, the optics block 1135 may include combinations of different optical elements. In some embodiments, one or more of the optical elements in the optics block 1135 may have one or more coatings, such as partially reflective or anti-reflective coatings.

Magnification and focusing of the image light by the optics block 1135 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1135 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1135 corrects the distortion when it receives image light from the electronic display generated based on the content.

The position sensor 1140 is an electronic device that generates data indicating a position of the headset 1105. The position sensor 1140 generates one or more measurement signals in response to motion of the headset 1105. Examples of a position sensor 1140 include: one or more IMUs, one or more accelerometers, one or more gyroscopes, one or more magnetometers, another suitable type of sensor that detects motion, or some combination thereof. The position sensor 1140 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1105 from the sampled data. For example, the IMU integrates the measurement signals received from the accelerometers over time to estimate a velocity vector and integrates the velocity vector over time to determine an estimated position of a reference point on the headset 1105. The reference point is a point that may be used to describe the position of the headset 1105. While the reference point may generally be defined as a point in space, however, in practice the reference point is defined as a point within the headset 1105.

The DCA 1145 generates depth information for a portion of the local area. The DCA 1145 includes one or more imaging devices and a DCA controller. The DCA 1145 may also include an illuminator that illuminates a portion of the local area with light. The light may be, e.g., structured light (e.g., dot pattern, bars, etc.) in the infrared (IR), IR flash for time-of-flight, etc. In some embodiments, the one or more imaging devices capture images of the portion of the local area that include the light from the illuminator. The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator), some other technique to determine depth of a scene, or some combination thereof.

The audio system 1150 provides audio content to a user of the headset 1105. The audio system 1150 may comprise one or acoustic sensors, one or more transducers, and an audio controller. The audio system 1150 may provide spatialized audio content to the user. In some embodiments, the audio system 1150 may request acoustic parameters from the mapping server 1125 over the network 1120. The acoustic parameters describe one or more acoustic properties (e.g., room impulse response, a reverberation time, a reverberation level, etc.) of the local area. The audio system 1150 may provide information describing at least a portion of the local area from e.g., the DCA 1145 and/or location information for the headset 1105 from the position sensor 1140. The audio system 1150 may generate one or more sound filters using one or more of the acoustic parameters received from the mapping server 1125 and use the sound filters to provide audio content to the user.

The displacement system 1155 determines an amount of displacement between two objects (e.g., between a projector and a waveguide of the display assembly 1130). In some embodiments, the displacement system 1155 corrects the amount of displacement between the two objects. The displacement system 1155 may include a displacement sensor (e.g., the displacement sensor 910) and a displacement controller (e.g., the displacement controller 920). Operation and structure of the displacement system 1155 is described above in more detail.

The I/O interface 1110 is a device that allows a user to send action requests and receive responses from the console 1115. An action request is a request to perform a particular action. For example, an action request may be an instruction to start or end capture of image or video data, or an instruction to perform a particular action within an application. The I/O interface 1110 may include one or more input devices. Example input devices include: a keyboard, a mouse, a game controller, or any other suitable device for receiving action requests and communicating the action requests to the console 1115. An action request received by the I/O interface 1110 is communicated to the console 1115, which performs an action corresponding to the action request. In some embodiments, the I/O interface 1110 includes an IMU that captures calibration data indicating an estimated position of the I/O interface 1110 relative to an initial position of the I/O interface 1110. In some embodiments, the I/O interface 1110 may provide haptic feedback to the user in accordance with instructions received from the console 1115. For example, haptic feedback is provided when an action request is received, or the console 1115 communicates instructions to the I/O interface 1110 causing the I/O interface 1110 to generate haptic feedback when the console 1115 performs an action.

The console 1115 provides content to the headset 1105 for processing in accordance with information received from one or more of: the DCA 1145, the headset 1105, and the I/O interface 1110. In the example shown in FIG. 11, the console 1115 includes an application store 1160, a tracking module 1165, and an engine 1170. Some embodiments of the console 1115 have different modules or components than those described in conjunction with FIG. 11. Similarly, the functions further described below may be distributed among components of the console 1115 in a different manner than described in conjunction with FIG. 11. In some embodiments, the functionality discussed herein with respect to the console 1115 may be implemented in the headset 1105, or a remote system.

The application store 1160 stores one or more applications for execution by the console 1115. An application is a group of instructions, that when executed by a processor, generates content for presentation to the user. Content generated by an application may be in response to inputs received from the user via movement of the headset 1105 or the I/O interface 1110. Examples of applications include: gaming applications, conferencing applications, video playback applications, or other suitable applications.

The tracking module 1165 tracks movements of the headset 1105 or of the I/O interface 1110 using information from the DCA 1145, the one or more position sensors 1140, or some combination thereof. For example, the tracking module 1165 determines a position of a reference point of the headset 1105 in a mapping of a local area based on information from the headset 1105. The tracking module 1165 may also determine positions of an object or virtual object. Additionally, in some embodiments, the tracking module 1165 may use portions of data indicating a position of the headset 1105 from the position sensor 1140 as well as representations of the local area from the DCA 1145 to predict a future location of the headset 1105. The tracking module 1165 provides the estimated or predicted future position of the headset 1105 or the I/O interface 1110 to the engine 1170.

The engine 1170 executes applications and receives position information, acceleration information, velocity information, predicted future positions, or some combination thereof, of the headset 1105 from the tracking module 1165. Based on the received information, the engine 1170 determines content to provide to the headset 1105 for presentation to the user. For example, if the received information indicates that the user has looked to the left, the engine 1170 generates content for the headset 1105 that mirrors the user's movement in a virtual local area or in a local area augmenting the local area with additional content. Additionally, the engine 1170 performs an action within an application executing on the console 1115 in response to an action request received from the I/O interface 1110 and provides feedback to the user that the action was performed. The provided feedback may be visual or audible feedback via the headset 1105 or haptic feedback via the I/O interface 1110.

The network 1120 couples the headset 1105 and/or the console 1115 to the mapping server 1125. The network 1120 may include any combination of local area and/or wide area networks using both wireless and/or wired communication systems. For example, the network 1120 may include the Internet, as well as mobile telephone networks. In one embodiment, the network 1120 uses standard communications technologies and/or protocols. Hence, the network 1120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1120 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 1125 may include a database that stores a virtual model describing a plurality of spaces, wherein one location in the virtual model corresponds to a current configuration of a local area of the headset 1105. The mapping server 1125 receives, from the headset 1105 via the network 1120, information describing at least a portion of the local area and/or location information for the local area. The user may adjust privacy settings to allow or prevent the headset 1105 from transmitting information to the mapping server 1125. The mapping server 1125 determines, based on the received information and/or location information, a location in the virtual model that is associated with the local area of the headset 1105. The mapping server 1125 determines (e.g., retrieves) one or more acoustic parameters associated with the local area, based in part on the determined location in the virtual model and any acoustic parameters associated with the determined location. The mapping server 1125 may transmit the location of the local area and any values of acoustic parameters associated with the local area to the headset 1105.

One or more components of system 800 may contain a privacy module that stores one or more privacy settings for user data elements. The user data elements describe the user or the headset 1105. For example, the user data elements may describe a physical characteristic of the user, an action performed by the user, a location of the user of the headset 1105, a location of the headset 1105, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A displacement sensor comprising:
    a plurality of stators attached to a stator frame, wherein each of the plurality of stators is oriented parallel to an axis of motion between the stator frame and a rotor frame; and
    a plurality of rotors disposed on a substrate attached to a rotor frame via an armature, wherein each of the plurality of rotors is oriented parallel to the axis of motion, and each rotor of the plurality of rotors is aligned with and configured to receive a corresponding stator of the plurality of stators to create a respective rotor-stator pair, and capacitance values of the rotor-stator pairs change as a function of a position of the stator frame relative to the substrate along the axis of motion,
    wherein an amount of displacement of the stator frame relative to the substrate is determined based in part on the capacitance values, and
    wherein the amount of displacement includes a first translation measurement along the axis of motion, a second translation measurement along a second axis that is orthogonal to the axis of motion, a third translation measurement along a third axis that is orthogonal to both the axis of motion and the second axis, a first rotational measurement around an axis parallel to the second axis, and a second rotational measurement around an axis parallel to the third axis.
2. The displacement sensor of claim 1, wherein each rotor of the plurality of rotors includes a cavity that is aligned with and configured to receive the corresponding stator, and each rotor-stator pair has a respective nominal position in which the stator is at least partially within the cavity, and the amount of displacement of the stator frame relative to the substrate is determined based on a change in capacitance values of the rotor-stator pair being in the nominal position to the rotor-stator pair being in a second position, the second position different from the nominal position.
3. The displacement sensor of claim 1, wherein a degree of stiffness of the armature controls the amount of displacement of the stator frame relative to the substrate.
4. The displacement sensor of claim 1, wherein each stator of the plurality of stators and each rotor of the plurality of rotors are rectangular in shape, and the rotor-stator pairs are arranged in a grouping with a long side of each stator and a long side of each rotor being aligned parallel to each other.
5. The displacement sensor of claim 1, wherein each stator of the plurality of stators and each rotor of the plurality of rotors are rectangular in shape, and the rotor-stator pairs are arranged in a first grouping and a second grouping, the first grouping is oriented with a long side of each stator and a long side of each rotor aligned parallel to the second axis and the second grouping is oriented with the long side of each stator and the long side of each rotor aligned parallel to the third axis.
6. The displacement sensor of claim 1, wherein the plurality of stators and the plurality of rotors are rectangular in shape, and the rotor-stator pairs are arranged in four groupings, two of the four groupings are oriented with a long side of each stator and a long side of each rotor aligned parallel to the second axis and the other two of the four groupings are oriented with the long side of each stator and the long side of each rotor aligned parallel to the third axis.
7. The displacement sensor of claim 1, wherein a rotor assembly including the plurality of rotors is coupled to an object by a bonding material affixing the rotor assembly to the object.
8. The displacement sensor of claim 1, wherein a rotor assembly including the plurality of rotors is coupled to an object by an opening in the rotor assembly that is connected to a portion of material extending from the object.
9. The displacement sensor of claim 1, wherein a stator assembly including the plurality of stators is coupled to a waveguide configured to guide image light, and a rotor assembly including the plurality of rotors is coupled to a projector configured to project image light into the waveguide, and wherein the waveguide and the projector are part of a display on a headset device.
10. The displacement sensor of claim 1, wherein a stator assembly including the plurality of stators is coupled to a waveguide configured to guide image light, and a rotor assembly including the plurality of rotors is coupled to a projector configured to project image light into the waveguide, and wherein the displacement sensor further comprises a displacement controller that is configured to:
    determine the amount of displacement of the waveguide relative to the projector, and
    responsive to a determination that the amount of displacement is greater than a threshold amount of displacement, determine a pixel shift amount, wherein the pixel shift amount is used to adjust the projected image light of the projector.
11. The displacement sensor of claim 1, wherein a stator assembly including the plurality of stators is coupled to a waveguide, and wherein the waveguide and the rotor frame are part of a headset device.
12. The displacement sensor of claim 1, wherein the armature includes a plurality of arms, and wherein the substrate disposed with the plurality of rotors is attached to the rotor frame via the plurality of arms.
13. The displacement sensor of claim 1, wherein the armature includes a plurality of arms, wherein first ends of the plurality of arms are attached to the substrate, and second ends of the plurality of arms are attached to the rotor frame, and wherein the plurality of arms are flexible to allow for displacement of the substrate relative to the rotor frame.

14. The displacement sensor of claim 13, wherein the displacement includes a first translation displacement along the axis of motion, a second translation displacement along the second axis, a third translation displacement along the third axis, a first rotational displacement around the axis parallel to the second axis, and a second rotational displacement around the axis parallel to the third axis.

15. A device comprising:
   a displacement sensor, configured to measure capacitance of rotor-stator pairs, comprising:
      a plurality of stators attached to a stator frame, wherein each of the plurality of stators is oriented parallel to an axis of motion between the stator frame and a rotor frame, and
      a plurality of rotors disposed on a substrate attached to a rotor frame via an armature, wherein each of the plurality of rotors is oriented parallel to the axis of motion, and each rotor of the plurality of rotors is aligned with and configured to receive a corresponding stator of the plurality of stators to create a respective rotor-stator pair; and
   a displacement controller configured to determine an amount of displacement of the stator frame relative to the substrate based on the measured capacitance of the rotor-stator pairs, wherein the measured capacitance of the rotor-stator pairs changes as a function of a position of the stator frame relative to the substrate along the axis of motion, and
   wherein the amount of displacement includes a first translation measurement along the axis of motion, a second translation measurement along a second axis that is orthogonal to the axis of motion, a third translation measurement along a third axis that is orthogonal to both the axis of motion and the second axis, a first rotational measurement around an axis parallel to the second axis, and a second rotational measurement around an axis parallel to the third axis.

16. The device of claim 15, wherein each rotor of the plurality of rotors includes a cavity that is aligned with and configured to receive the corresponding stator, and each rotor-stator pair has a respective nominal position in which the stator is at least partially within the cavity, and the displacement controller determines the amount of displacement of the stator frame relative to the substrate based on a change in the measured capacitance of the rotor-stator pair from the rotor-stator pair being in the nominal position to the rotor-stator pair being in a second position, the second position different from the nominal position.

17. The device of claim 15, wherein a stator assembly including the plurality of stators is coupled to a waveguide configured to guide image light, and a rotor assembly including the plurality of rotors is coupled to a projector configured to project image light into the waveguide, and wherein the waveguide and the projector are part of a display on a headset device.

18. The device of claim 15, wherein a stator assembly including the plurality of stators is coupled to a waveguide configured to guide image light, and a rotor assembly including the plurality of rotors is coupled to a projector configured to project image light into the waveguide, and wherein the displacement controller is further configured to:
   determine the amount of displacement of the waveguide to the projector, and
   responsive to a determination that the amount of displacement is greater than a threshold amount of displacement, determine a pixel shift amount, wherein the pixel shift amount is used to adjust the projected image light of the projector.

19. The device of claim 15, wherein the armature includes a plurality of arms, wherein first ends of the plurality of arms are attached to the substrate, and second ends of the plurality of arms are attached to the rotor frame, and wherein the plurality of arms are flexible to allow for displacement of the substrate relative to the rotor frame.

20. The device of claim 19, wherein the displacement includes a first translation displacement along the axis of motion, a second translation displacement along the second axis, a third translation displacement along the third axis, a first rotational displacement around the axis parallel to the second axis, and a second rotational displacement around the axis parallel to the third axis.

* * * * *